(12) United States Patent
Muren et al.

(10) Patent No.: US 10,960,974 B2
(45) Date of Patent: Mar. 30, 2021

(54) RESONANT OPERATING ROTOR ASSEMBLY

(71) Applicant: FLIR Unmanned Aerial Systems AS, Hvalstad (NO)

(72) Inventors: Petter Muren, Nesbru (NO); Trygve Frederik Marton, Slependen (NO); Ivar Johnsrud, Honefoss (NO); Pal Hagh Sandberg, Hvalstad (NO); Christian Moengen, Spikkestad Buskerud (NO); Jo Eyvin Bjaarstad, Vettre Akershus (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 221 days.

(21) Appl. No.: 16/041,512

(22) Filed: Jul. 20, 2018

(65) Prior Publication Data

US 2019/0047688 A1     Feb. 14, 2019

Related U.S. Application Data

(63) Continuation of application No. PCT/EP2017/051076, filed on Jan. 19, 2017.

(30) Foreign Application Priority Data

Jan. 20, 2016  (NO) .................................. 20160105

(51) Int. Cl.
  *B64C 27/00*   (2006.01)
  *B64C 27/625*  (2006.01)
  (Continued)

(52) U.S. Cl.
  CPC ............. *B64C 27/54* (2013.01); *A63H 27/12* (2013.01); *B64C 27/001* (2013.01); *B64C 27/48* (2013.01);
  (Continued)

(58) Field of Classification Search
  CPC ... B64C 27/001; B64C 27/003; B64C 27/005; B64C 27/322; B64C 27/48; B64C 27/54;
  (Continued)

(56) References Cited

U.S. PATENT DOCUMENTS 2,531,598 A * 11/1950 Avery .................. B64C 27/008
                                                     416/31
3,999,886 A    12/1976 Ormiston et al.
(Continued)

FOREIGN PATENT DOCUMENTS

DE    2638148    3/1978
DE    3802551    8/1989
(Continued)

*Primary Examiner* — David Hamaoui
*Assistant Examiner* — Brian O Peters
(74) *Attorney, Agent, or Firm* — Haynes and Boone, LLP

(57) ABSTRACT

The present embodiments disclose a torque dependent and resonant operating thrust-generating rotor assembly including a cyclic pitch control system for controlling tilting moments about a longitudinal rotor blade axis of one or more rotor blades, in order to control the pitch angle of the rotor blades and thereby also the horizontal movements of a helicopter vehicle or a rotary wing aircraft. A rotor torque assembly of the rotor assembly is further configured to operate in resonance, thereby providing a resonant gain effecting a rotational offset in relation to changes in torque generated by the motor.

20 Claims, 9 Drawing Sheets

(51) Int. Cl.
  *B64C 27/54*   (2006.01)
  *B64C 27/48*   (2006.01)
  *A63H 27/00*   (2006.01)
  *G05D 1/08*    (2006.01)
  *B64C 27/635*  (2006.01)
  *B64C 39/02*   (2006.01)

(52) U.S. Cl.
  CPC .......... *B64C 27/625* (2013.01); *B64C 27/635* (2013.01); *G05D 1/08* (2013.01); *B64C 39/024* (2013.01); *B64C 39/028* (2013.01); *B64C 2027/005* (2013.01); *B64C 2201/024* (2013.01); *B64C 2201/108* (2013.01)

(58) Field of Classification Search
  CPC ....... B64C 27/58; B64C 27/59; B64C 27/635; B64C 2027/001; B64C 2027/003; B64C 2027/005; B64C 39/024; B64C 39/028; A63H 27/12
  See application file for complete search history.

(56) References Cited

U.S. PATENT DOCUMENTS

| | | |
|---|---|---|
| 5,046,923 A | 9/1991 | Parsons et al. |
| 5,636,970 A | 6/1997 | Certain |
| 8,342,440 B2 * | 1/2013 | Papanikolopoulos ...................... A63H 27/12 244/17.11 |
| 2011/0278391 A1 | 11/2011 | Kotler |
| 2012/0263590 A1 | 10/2012 | Mercier Des Rochettes et al. |
| 2013/0134264 A1 * | 5/2013 | Carter, Jr. ............ B64C 27/025 244/7 A |

FOREIGN PATENT DOCUMENTS

| | | |
|---|---|---|
| DE | 101 25 734 | 9/2002 |
| DE | 10 2006 042575 | 3/2008 |
| EP | 0515998 | 12/1992 |
| KR | 2013 0078482 | 7/2013 |
| NO | 337961 | 7/2016 |
| WO | WO 2005/087587 | 9/2005 |
| WO | WO 2015/138655 | 9/2015 |

* cited by examiner

RESONANT OPERATING ROTOR ASSEMBLY

CROSS-REFERENCE TO RELATED APPLICATIONS

This application is a continuation of International Patent Application No. PCT/EP2017/051076 filed Jan. 19, 2017 and entitled "RESONANT OPERATING ROTOR ASSEMBLY," which is incorporated herein by reference in its entirety.

International Patent Application No. PCT/EP2017/051076 filed Jan. 19, 2017 claims priority to and the benefit of Norwegian Patent Application No. 20160105 filed Jan. 20, 2016 and entitled "RESONANT OPERATING ROTOR ASSEMBLY," which is hereby incorporated by reference in its entirety.

TECHNICAL FIELD

The present invention relates to a torque dependent resonant operating rotor assembly for controlling moment forces about the blade pitch axis of a rotor blade, thereby controlling the blade pitch angle and ultimately the movements of a rotary wing aircraft.

BACKGROUND

Unmanned Aerial Vehicles (UAVs) are used in a wide range of applications, both civilian and military, including inspection, intelligence, reconnaissance and rescue missions. UAV designs range from large fixed wing jets to smaller rotary wing aircraft with one or more rotors. Progress in the electronics industry over the past decades have made it possible to shrink the components necessary for an unmanned aerial vehicle system to become palm sized, a so-called Micro Air Vehicle (MAV). These vehicles can for example lift a camera and transmit video images while still being highly maneuverable.

Regardless of the size, rotary wing aircraft like helicopters are typically sustained by one or more rotors rotating about vertical rotor shafts. In conventional helicopters, the amount of thrust from the rotor and the direction of the thrust may be controlled by changing the pitch angle of the rotor blades. The horizontal direction of flight and the stability of the helicopter may be controlled by cyclically adjusting the pitch angle of the rotor blades through a so-called swash plate. Cyclically adjusting the pitch angle means that the pitch angle of each rotor blade is adjusted from a maximum in one particular position to a minimum 180 degrees later in the rotation. When the blade pitch alters like this, the initially vertical thrust tilts, and thereby generates a horizontal vector, moving the helicopter in the desired direction. By collectively changing the blade pitch of all the rotor blades, i.e. changing the blade pitch of all blades with the same amount, or by changing the rotational speed of the rotor, the helicopter may be controlled in a vertical direction.

The alteration in blade pitch angle of the rotor blades is typically done by operating control rods attached to the swash plate, a unit consisting of a rotating disc and a non-rotating disc rotationally connected to each other. Typically, the inner end of each blade is connected to the rotating disc via pitch links, while the control rods are attached to the non-rotating disc. Operating the control rods incline or decline the swash plate at one or several points. As the rotor rotates, the blade pitch angle of the rotor blades are cyclically adjusted through the rotation as they move over the section inclined or declined by the swash plate control rods.

The control rods in a rotary wing aircraft are typically attached to, or constitutes of, servos that operate the movement of the control rods on input signals from the pilot, making the aircraft move in the desired direction. However, in light of advances in MAV technology, and to enable simpler and lower-cost aircraft, it is desirable to utilize a design that does not rely on the previously mentioned swash plate and servos for maneuvering an aircraft.

Some conventional rotor control systems exist where rapid changes in rotor torque are transferred into moment forces acting about the blade pitch axis of a rotor blade in a thrust-generating rotor, to ultimately control the movements of a rotary wing aircraft. However, such systems often require applying relatively large alterations in torque to provide a substantial change in blade pitch angle and consequently an altered horizontal direction. Such conventional systems may therefore have significant limits in the speed and the wind it may be subject to and still be able to fully operate. Conventional systems also contemplate resonances in rotor systems, but all known rotor systems in use today try to avoid resonance in every part of the rotor assembly. For example, bending and stress occurring at rotor blades are mainly caused by vibrations and resonance due to structural coupling between the fuselage and the rotor, and this should be avoided whenever possible, and many conventional techniques or arrangements are designed to eliminate or reduce resonance in the rotor system itself or between the rotor and the aircraft.

Thus, there is a need in the art for a relatively simple torque dependent rotor control system for small MAVs and larger rotary wing aircraft, particularly in the context of use of resonant gain without the disadvantages and limitations discussed above, to enable simpler, better and more efficient rotor systems.

BRIEF SUMMARY

An objective of the embodiments herein is to overcome or at least alleviate the above mentioned disadvantages. This object and other objects are achieved by the claims enclosed herein.

According to one embodiment, the objective may be achieved by a cyclic pitch control system for controlling the blade pitch angle of a thrust generating rotor assembly. The rotor assembly may include a rotor torque assembly including a rotor shaft, rotationally connected to a rotor blade assembly having rotor blades being able to tilt about a rotor blade axis, wherein the rotor blade assembly has a tilting moments of inertia about the rotor blade axis and a first rotational moments of inertia about a rotor shaft axis and where the rotor torque assembly, including a rotational part of a motor connected to the rotor torque assembly, has a second rotational moments of inertia about the rotor shaft axis that is substantively smaller than the first rotational moments of inertia. The cyclic pitch control system may further include at least one spring member, connected to both the rotor torque assembly and the rotor blade assembly, configured to transfer torque, a motor controller adjusted to transform a control signal into control of a torque generated by the motor throughout each rotation, and a connecting member configured to transfer changes in a rotational offset between the rotational position of the rotor torque assembly and the rotor blade assembly into changes in rotor blade pitch. The rotational speed of the rotor blade assembly, due to its relatively higher first rotational moments of inertia, will typically vary substantially less than the rotational speed of the rotor torque assembly. The characteristics of the at least one spring member, the tilting moments of inertia, and the second rotational moments of inertia, may be adjusted with respect to each other to provide a rotational resonance frequency range of the rotor torque assembly within a range of rotational frequencies of operation for the rotor assembly, thereby providing a resonant gain effecting the rotational offset in relation to changes in torque generated by the motor.

In another embodiment, the cyclic pitch control system has a maximum level of resonant gain controlled by an amount of damping from a torque damper.

In another embodiment, the rotational offset is controlled by the motor controlling means during a rotation by adjusting the torque from the motor at a desired rotational position provided by a rotational sensing means adjusted to measure or calculate rotational positions of the rotor torque assembly with respect to a reference position, and where the connecting member transfer cyclic changes in the rotational offset into cyclic changes in the blade pitch angle.

In another embodiment, the pitch damper, interacting with a pitch arm, is adjusted to transfer said changes in rotational offset into substantial tilting moments about said rotor blade axis at rapid changes in rotor torque and to cancel or limit said tilting moments at slow or permanent changes in rotor torque, and where said tilting moments acts on at least one rotor blade to control said blade pitch angle.

In another embodiment, the pitch damper comprises a first concentric part and a second concentric part, adapted to fit together, and a damping means between the two concentric parts, said damping means being adjusted so the two concentric parts generally follow each other's movements at rapid or cyclic changes in the speed and position of the first concentric part, and allow the movements of the concentric parts to differ with respect to each other at a slow or permanent change in the speed and position of the first concentric part.

In another embodiment, the torque damper comprises a first concentric part and a second concentric part, adapted to fit together, and a damping means between the two concentric parts, a pitch hinge pin extending from the first concentric part of the torque damper through a centrally placed hole in the second concentric part, further through a larger diameter hole in the connecting member and into a center member, a fastening means fixing the pitch hinge pin to the central member, enabling the connecting member to tilt about the pitch hinge pin independent of the torque damper.

In another embodiment, the pitch damper is mounted on the rotor blade assembly and where the said concentric parts are adjusted to rotate in a plane generally perpendicular to the rotor blade axis, and where the second concentric part is fixed to the rotor blade assembly and the first concentric part is connected to the upper end of the pitch arm, and where the lower end of the pitch arm is connected to a rotor head by a hinged pitch arm connection.

In another embodiment, the rotor blades are dynamically stable and/or said rotor blade assembly comprises a stabilizing flybar adjusted to create a stabilizing tilting moment about the rotor blade axis as long as there is a difference in blade pitch angle between the rotor blades in the rotor blade assembly.

In another embodiment, the at least one spring member constitutes at least parts of the rotor shaft, and is molded together with a rotor head and a central member of the thrust generating rotor assembly as one combined part.

In another embodiment, the at least one spring member is formed by polymer material reinforced with fiber composite.

In another embodiment, the rotor blade assembly includes a first blade and an oppositely pointing second blade respectively being allowed to alter their blade pitch angle by means of pitch hinges mounted in the rotor blade axis, and wherein the pitch arm interacting with the pitch damper is connected to the first blade.

In another embodiment, the resonant gain is between 1.1 and 4.

In another embodiment, the first rotational moment of inertia is between four and ten times that of the second moment of inertia.

In another embodiment, the first rotational moment of inertia is between ten and twenty times that of the second moment of inertia.

According to another embodiment, the objective may be achieved by a cyclic pitch control system for controlling the blade pitch angle of a thrust generating rotor assembly. The rotor assembly may include a rotor torque assembly itself including a rotor shaft rotationally connected to a rotor blade assembly having rotor blades configured to tilt about a rotor blade axis. The cyclic pitch control system may include a connecting member configured to transfer changes in a rotational offset between the rotational position of the rotor torque assembly and the rotor blade assembly into changes in rotor blade pitch, and at least one spring member connected to both the rotor torque assembly and the rotor blade assembly and configured to transfer torque between the rotor torque assembly and the rotor blade assembly, wherein the at least one spring member and/or moments of inertia associated with the rotor blade assembly and the rotor torque assembly are configured to provide a rotational resonance frequency range of the rotor torque assembly at least partially within a range of rotational frequencies of operation for the rotor assembly.

According to another embodiment, the objective may be achieved by a method to operate such cyclic pitch control system.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
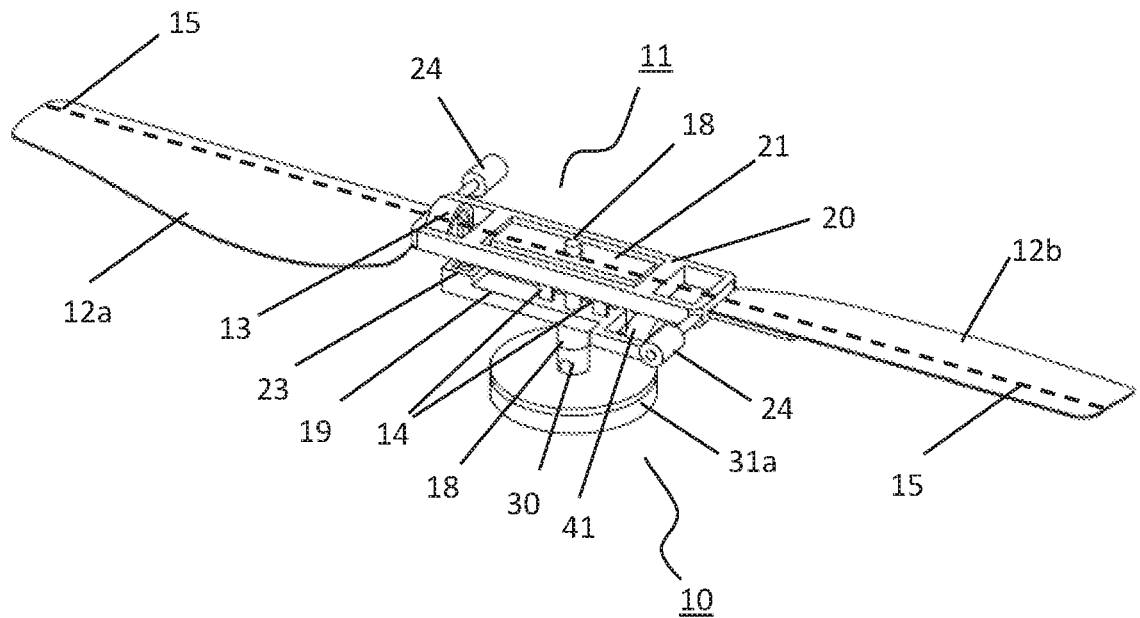
FIGS. 1a and 1b illustrate perspective views of a thrust-generating rotor assembly in a stationary position according to one embodiment of the present invention.

The present invention discloses a torque dependent and resonant operating thrust-generating rotor assembly including a cyclic pitch control system for controlling tilting moments about a longitudinal rotor blade axis of one or more rotor blades in order to control the pitch angle of the rotor blades and thereby also the horizontal movements of a helicopter vehicle or a rotary wing aircraft. The tilting moments acting on the rotor blades are transferred to the blades through a pitch arm and a specially adapted damping member in order to allow rapid changes in rotor torque to create cyclic changes in blade pitch angle. Slow or permanent changes are cancelled out allowing for a change in rotational speed of the rotor without permanently affecting the blade pitch angles. In various embodiments, a desired change in lift may therefore be achieved by adjusting the rotational speed of the rotor.

Further, embodiments herein show systems adjusted to operate in resonance, or more specifically, where the driving part of the rotor assembly comprises members configured to enable the system to operate in resonance in a controlled manner. The main reason for operating the systems in resonance is to effectively increase the change in cyclic blade pitch angle for a given change in torque generated by the motor.

Details on how the embodiments of the present invention exploit resonance to safely increase the gain of the cyclic pitch alterations of the system will be explained below. However, first the various other parts that constitute the rotor assembly will be presented and the blade pitch control function of the rotor assembly will be discussed.

Rotor Assembly with Cyclic Blade Pitch Angle Control

In the following, the present invention will be discussed and example embodiments described by referring to the accompanying drawings.

FIGS. 1a through 2b show an example embodiment of a resonant operating thrust-generating rotor assembly comprising a torque dependent cyclic pitch control system. The rotor assembly comprises two sub-assemblies: a rotor blade assembly 11 and a rotor torque assembly 10 including the rotating part of a motor 31.

The rotor blade assembly 11 includes two generally horizontally mounted and oppositely pointing rotor blades 12a and 12b each having a predetermined airfoil, set at a predetermined nominal blade pitch angle 16. The rotor blade assembly 11 has a rotor blade axis 15 extending along the length of the blades 12 from a tip of one blade, e.g. the first rotor blade 12a, to a further tip of the opposite pointing blade, the second rotor blade 12b. Purely as an example, the rotor blades 12 may be made of a carbon fiber composite to make them thin and robust.

A centrally positioned connecting member 20 extends longitudinally along the rotor blade axis 15 and is adapted to provide a frame for connecting the rotor blades 12 and the additional parts that constitute the rotor blade assembly 11. The connecting member 20 is designed to have a desired stiffness to fit the range of forces occurring under operation. The connecting member 20 may be manufactured of any suitable metal, polymer or composite material with the required stiffness and/or flexibility. According to one example, the connecting member 20 is preferably made of a carbon fiber composite. The inner part of each of the two oppositely pointing rotor blades 12 are rigidly fixed to the corresponding outer parts of the connecting member 20. The position of the rotor blades 12 and the predetermined nominal blade pitch angle 16 may be adjusted to provide the required thrust and dynamical stability of the rotor blade assembly 11 during operation.

Alternatively, or in addition, two stabilizing flybars 24 may be mounted on the connecting member 20, close to the inner end of each rotor blade 12. The generally horizontal stabilizing flybars 24 are typically mounted perpendicular to the rotor blade axis 15 and may take any shape. The mass of the flybars 24 are positioned well in front of the rotor blade axis 15. The flybars 24 are adjusted to counter and balance the properties of the rotor blade assembly 11 to make it more dynamically stable during operation. Dynamically stable refers to the effect that a rotor blade assembly 11 with an asymmetrical blade pitch angle 16 of the two rotor blades 12a and 12b will, over time, achieve a level position with symmetrical blade pitch angle 16, due to the characteristics of the airfoil, stabilizing flybar 24, and the inertia and aerodynamic forces acting on the different elements.

In some embodiments, the rotor blades 12, the connecting member 20 and the flybars 24 may be molded as one part to reduce complexity and assembly time during manufacturing. As an example, this combined part may be made of a carbon fiber composite material.

In other embodiments, specially designed and aerodynamically stable rotor blades may be used in order to reduce the need for flybars 24. Rotor blades having an airfoil with a so-called reflex in the aft end, a trailing end that curves upwards, may provide the rotor blade assembly 11 with the required dynamic stability without the use of stabilizing flybars 24. Rotor blades 12 having a conventional airfoil may also be used in a stable rotor blade assembly 11 if they are positioned with their center of lift well behind the rotor blade axis 15.

To allow the connecting member 20 and the rotor blades 12 to tilt about the rotor blade axis 15, so that the blade pitch angle 16 can change, the connecting member 20 is rotationally connected to a central member 21 by virtue of pitch hinge pins 17. As may be viewed in FIG. 2b there are two pitch hinge pins 17a and 17b, positioned and oriented along the rotor blade axis 15, one at each of the two outer ends of the central member 21. The central member 21 may be of any suitable shape that allows a certain gap to the connecting member 20, in order to allow rotation of the connecting member 20 about the two pitch hinge pins 17. The central member 21 may be produced of any suitable metal, polymer or composite material with the required material qualities. According to one embodiment, the central member 21 is preferably made of a polymer material reinforced with fiber composite.

It is not required that the central member 21 be positioned in the same plane as the connecting member 20, in line with the rotor blade axis 15. In alternative embodiments the central member 21 may be positioned above or below, with the pitch hinge pins 17 held by additional brackets extending in the required direction.

The connecting member 20 is further allowed to rotate about a generally vertical rotor shaft 18 in a plane perpendicular to the rotor shaft axis by means of a circular hole in the center of the connecting member 20. Apart from the rotor shaft 18, the parts described above constitute the rotor blade assembly 11.

The rotor blade assembly 11 is, as discussed above, positioned and centered about the rotor shaft 18 by the connecting member 20 and further connected to the rotor torque assembly 10 by means of spring members 14. Purely as an example, FIGS. 1a through 2b show two spring members 14, made of a flexible material chosen to fit the torque range of a motor 31 that is connected to the rotor shaft 18. Alternatively, there may be just one, or a plurality of spring members 14 in different shapes and combinations of materials.

In one embodiment of the invention, the spring members 14 could be made from a rubber material with the desired elastic and flexible qualities. Alternatively, the spring members could be made from any elastic and/or flexible material, including polymers, e.g. synthetic rubber, composite fiber or spring-metal. A spring member 14 may also be made of a combination of materials, some parts rigid to add structural properties to the rotor assembly and some parts flexible to provide the desired spring effect.

The rotor torque assembly 10 comprises the generally vertical rotor shaft 18 rotating about the rotor shaft axis, and a rotor head 19 fixed to the rotor shaft 18. Torque driving the rotor is transferred from the motor 31 through the motor connection 30 to the lower end of the rotor shaft 18 and to the rotor head 19. From the rotor head 19, torque is further transferred by the spring members 14 to the central member 21 in the rotor blade assembly 11. The motor 31 is typically a direct drive electric motor or a geared motor driving the rotor through a transmission.

The rotating part of the motor 31a is fixed by the motor connection 30 to the rest of the rotor torque assembly 10 and is the last part constituting the rotor torque assembly 10. To be able to transfer changes in torque to the rest of the rotor assembly without any loss or misalignment, it is important that the rotating part of the motor 31a is fixed securely, and effectively becomes a functional part of the rotor head 19.

According to one example embodiment, the motor connection 30 may be designed in two parts to ensure adequate transfer of torque and other desired properties. Other desired properties may for example be a design that enables a quick substitution of the rotor assembly, a design that enables the rotor to fall off if subject to a crash, a locking function for ease of production or other. The upper part of the motor connection 30 may alternatively be fixed directly to the rotor head 19 without a rotor shaft 18 in between while the lower part of the motor connection 30 may alternatively be fixed directly to, or adapted to be an integrated part of, the rotating part of the motor 31.

Under operation, when the rotor rotates about the rotor shaft axis, an alteration in torque from the motor 31 will result in forces acting on the spring members 14 which connect the rotor blade assembly 11 to the rotor torque assembly 10. The rotor torque assembly 10, including the rotating part of the motor 31a, has relatively low moments of inertia compared to the rotor blade assembly 11 and will start to change its rotational speed in response to any alterations in applied torque from the motor 31. The rotor blade assembly 11, with its much higher rotational moments of inertia, will need a much longer time to change its rotational speed.

Figure 3A:
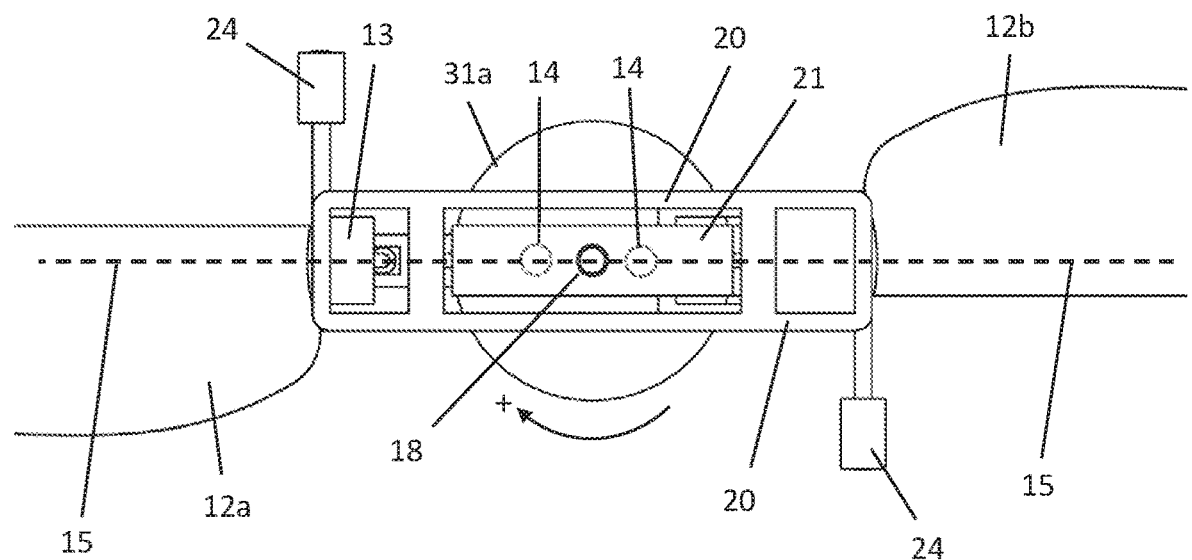
FIGS. 3a and 3b illustrate the thrust-generating rotor assembly from above and the side with nominal pitch and no alteration from nominal torque according to one embodiment of the present invention.
Figure 3B:
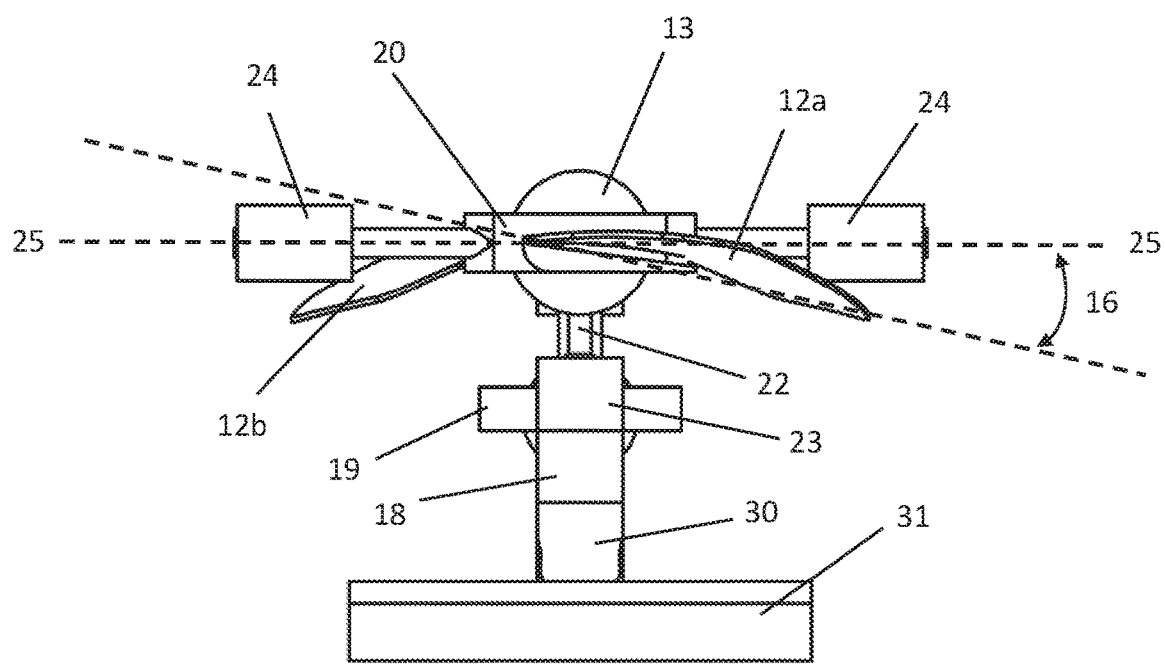

In a traditional implementation of a rotor, the members connecting the rotor blades to the rotor head are rigid or adjusted to allow very little relative rotational movement between the rotor blades and the rotor head. In the present invention, however, the characteristics and the position of the spring members 14 imply that the inertia and drag forces acting on the rotor blade assembly 11 will cause a deformation or bending of the spring members 14 in case of an alteration in torque. This deformation will result in an offset in the rotational position between the rotor blade assembly 11 and the rotor torque assembly 10. In the present disclosure, this offset is referred to as the rotational offset 26, and may be seen by comparing the top view of FIGS. 3a, 4a and 5a. The characteristics of the spring members 14 imply that the initial rotational offset 26 viewed in the rotor plane 25, a plane perpendicular to the rotor shaft axis in which the rotor blades rotate, will move clockwise or counterclockwise relative to the rotor blade axis 15, when an alteration in torque is applied.

In short, the rotational offset 26 may be described as the result of inertia forces and aerodynamical drag forces acting on the rotor blades 12, causing the whole rotor blade assembly 11 to "lag behind" in its rotational movement. The drag forces balance out the nominal or constant rotor torque and results in an initial or nominal rotational offset 26, while inertia forces balance out alterations in torque to provide clockwise or counterclockwise alterations in the rotational offset 26.

Again referring to FIGS. 1a through 2b, the remaining features and function of the cyclic pitch control system will be described further.

A pitch arm 22 is mounted between the rotor blade assembly 11 and the rotor torque assembly 10. In different embodiments of the present invention, the pitch arm 22 is at one of its ends, upper or lower, interacting with a rotating damping member. A function of the pitch arm 22 is to create a tilting moment about the rotor blade axis 15 in order to alter the blade pitch angle 16 of at least one rotor blade 12. The pitch arm 22 is in the example embodiment shown in FIGS. 1a-b mounted to, and extending down from this damping member, called the pitch damping means 13, or just the pitch damper 13. The pitch damper 13 is mounted to the rotor blade assembly 11 at the inner end of the first rotor blade 12a. In its lower end, the pitch arm 22 is connected to the rotor torque assembly 10 through a pitch arm connection 23. In alternative embodiments, the pitch damper 13 could instead be mounted between the lower end of the pitch arm 22 and the rotor torque assembly 10 while the upper end of the pitch arm 22 is connected directly to the rotor blade assembly 11. The pitch arm 22 is required to interact with the pitch damper 13, and they may both have a number of different shapes and orientations.

Figure 1B:
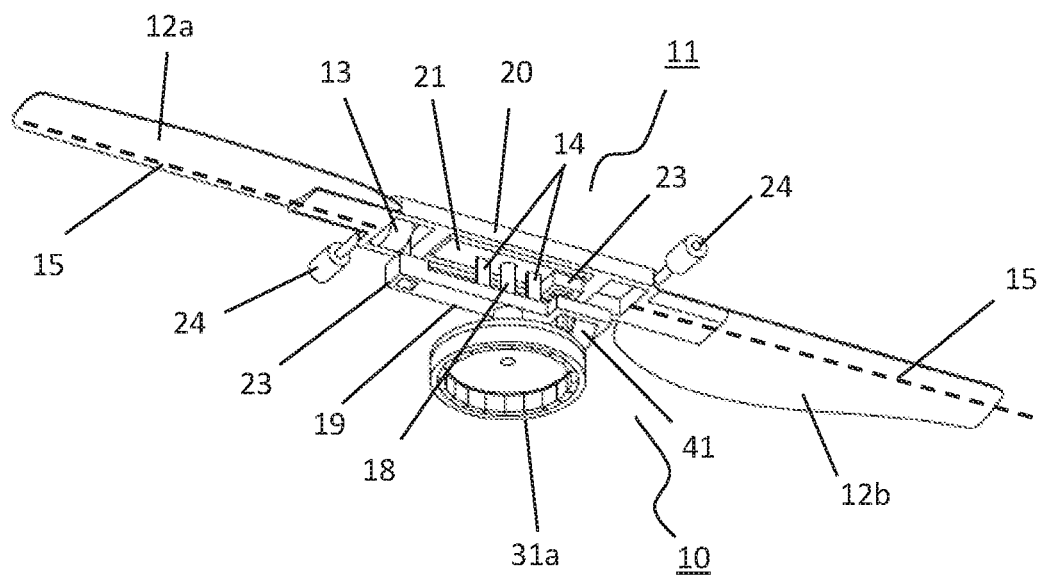

The pitch arm connection 23 is, in the embodiment shown in FIGS. 1a-b, mounted to an outer end of the rotor head 19, below the inner end of the first rotor blade 12a. Purely as an example, the pitch arm connection 23 may constitute a ball member inside a member with a rectangular vertical hole to allow the ball member to tilt freely back and forth, and to move up and down in the rectangular hole while transferring forces in a generally horizontal direction. In one embodiment of the invention, the pitch arm 22 could be made from a rigid or stiff material with the desired qualities. Purely as an example, the pitch arm 22 could be made from, metal, carbon fiber composite or injection-molded plastic.

The pitch damper 13 is a speed dependent force and position transmitting member that enables the cyclic pitch control system to work over a large span in rotor torque, and it allows a dynamically stable rotor blade assembly 11 to regain a symmetrical blade pitch angle 16 over time, independent of the average rotor torque. These properties are preferred when the thrust-generating rotor assembly, including the present control system, is to be used in an aircraft operating in wind or turbulent environment or if the aircraft is operating over a large span in flight speeds.

In one embodiment of the invention, the pitch damper 13 comprises a first concentric part and a second concentric part adapted to rotationally fit within each other. The pitch damper 13 further incorporates a desired damping material filling a predefined gap between the first and second concentric parts. Viscous properties of the damping material may be chosen to limit, or substantively reduce, movement of the second concentric part with respect to the first concentric part when there is a rapid change in their relative rotational speed or position. At the same time, the viscous properties of the damping material allow larger movement of the second concentric part with respect to the first concentric part if the changes in rotational speed or position are slow. In other words, the first and second concentric parts of the pitch damper 13 generally follow each other's rotational movement when the movement is rapid, but not necessarily when the movement is slow. Further, in this disclosure, the movement of one of the concentric parts in relation to the other concentric part is referred to as the damping member offset.

Figure 2A:
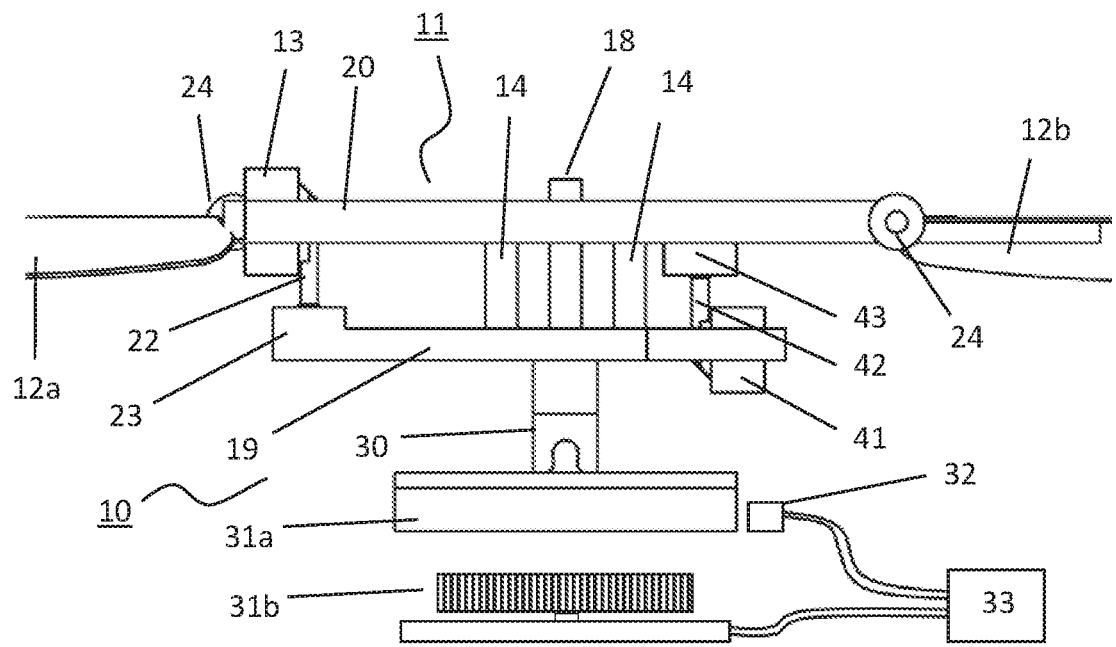
FIGS. 2a and 2b illustrate the thrust-generating rotor assembly from the front in a plan view and in a plan cut-through view according to one embodiment of the present invention.
Figure 2B:
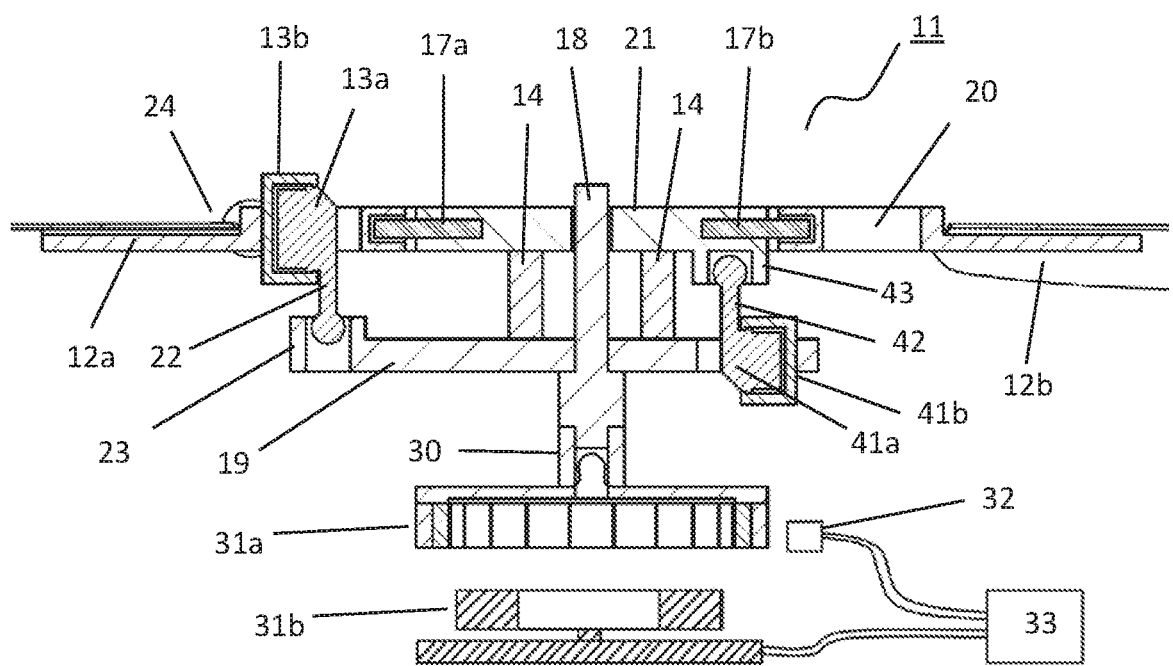

In some embodiments, and as may be viewed in FIG. 2b, the first concentric part 13a of the pitch damper 13 is adjusted to fit inside, and rotate inside, the second concentric part 13b like a rotating member inside a housing. The second concentric part 13b of the pitch damper 13 then constitutes the housing. According to this embodiment a seal (not shown) is also needed between the first and second concentric part to preserve the damping member fluid. The second concentric part 13b is positioned at the inner end of the first rotor blade 12a with the rotational axis in line with the rotor blade axis 15. The second concentric part 13b is furthermore fixed to the rotor blade assembly 11, so when it rotates, the rotor blade assembly 11 will have to follow this movement, rotating or tilting about the rotor blade axis 15, hence changing the blade pitch angle 16. The upper end of the pitch arm 22 is fixed to the first concentric part 13a of the pitch damper 13. Therefore, when the pitch arm 22 starts to tilt, the first concentric part 13a of the pitch damper 13 must start to rotate.

Furthermore, a rapid movement or alteration described in this disclosure refers to alterations or changes that occur in less than one rotation of the rotor. Typically, a rapid change will be a change in one direction that is completed within half a rotation of the rotor. A cyclic alteration or alternation in torque is an example of a rapid alteration. A slow alteration described in this document refers to an alteration that takes more than one rotation of the rotor to complete. Typically, these slow alterations occur over two or more rotations of the rotor. Gradual or incremental changes in torque to obtain a new rotational speed of the rotor are examples of slow alterations.

Several different materials and designs may be utilized in the pitch damper 13. Purely as an example, the pitch damper 13 could be a passive damping member, and incorporate a material that provides the desired properties under stress. In one embodiment of the invention, the pitch damper 13 incorporates a passive damping member material that could be a viscous material, e.g. a paste or an oil, having a viscosity that fit the physical properties of the rotor. Carefully designed pitch dampers 13 using friction and air as a damping member material are also possible. Another example is a combination of permanent magnets and a non-magnetic metallic material, e.g. aluminum, which utilize the so called Lenz effect to build a passive damping member without the use of a liquid or paste-like material. This alternative embodiment depends on speed induced electromagnetic forces that affect friction between the magnet and the metallic material, and due to the lack of temperature dependent materials, has an advantage in a very cold environment.

Alternatively, the pitch damper 13 may incorporate an active damping member material and include, for example, electromagnets reacting to input signals from a motor controlling means or motor controller 33. Purely by way of example, the pitch damper 13 could be fitted with a combination of an active and passive damping member material. The damping properties of the pitch damper 13 do not necessarily have a strict linear or quadratic function in relations to its movements, but it may be chosen based on the force it needs to transfer and the frequency of torque alterations i.e. the rotational speed of the rotor 12. The pitch damper 13 may, however, preferably be designed in a way that enables the tilting moment being transferred through it to follow the rate of changes in rotational offset 26 in a predictable manner.

In the example embodiments and based on the descriptions above, it may now be seen that: a rapid change in the rotational offset 26 will, through the pitch arm connection 23, cause the lower end of the pitch arm 22 to start moving and thereby, through the pitch damper 13, create a tilting moment about the rotor blade axis 15. When the forces acting through the pitch arm 22 and the pitch damper 13 are large enough to overcome the inertia about the rotor blade axis 15, the rotor blades 12 including the flybars 24 will start to tilt and eventually the blade pitch angle 16 will change.

Moreover, the rotor torque assembly 10 is connected to the motor 31 as a means of rotating the rotor. Further, the rotational position of the rotor torque assembly 10 is monitored via a rotational sensing means or rotational sensor 32. Purely as an example, the rotational sensor 32 could be a magnetic sensor which is configured to provide signals representative of the rotational position of the rotor torque assembly 10. Alternatively, the rotational sensor 32 could be any kind of position sensor, for example an optic sensor, a potentiometer, a magnetic sensor or an acoustic sensor. The rotational sensor 32 is further connected to a motor controller 33 for providing input signals for controlling the motor 31. The motor controller 33 is further provided with means or otherwise configured to receive flight command inputs from a pilot or an autopilot (not shown).

The rapid or slow alterations in torque initiated from the motor controller 33 through the motor 31, are utilized as means for providing a cyclic change in blade pitch angle 16 for maneuvering the aircraft. As mentioned earlier, cyclic implies that these alterations in torque occur at a desired position, and are repeated in several rotations of the rotor to achieve the desired movement of the aircraft. As will be explained, a rapid cyclic alteration in torque will provide a respective movement of the aircraft in a horizontal direction. Alternatively, a slow alteration in torque may be applied to change the rotational speed of the rotor to provide a movement in a vertical direction. These rapid and slow alterations in torque may be applied in any combination and at any point during the rotation of the rotor to provide the desired movements of the aircraft in all directions.

The function and control of the example embodiment shown in FIGS. 1a through 2b will now be further described through operational examples. The stepwise explanation below is supported by the drawings in FIGS. 3a to 6b.

When going through the examples below, it is important to notice that the additional damping member, the torque damping member, or just the torque damper 41, influences the amplitude of the rotational offset 26 but not the principle behind the blade pitch control. The torque damper 41 will be discussed in detail later when the resonant operation of the rotor torque assembly 10 is explained.

Figure 4A:
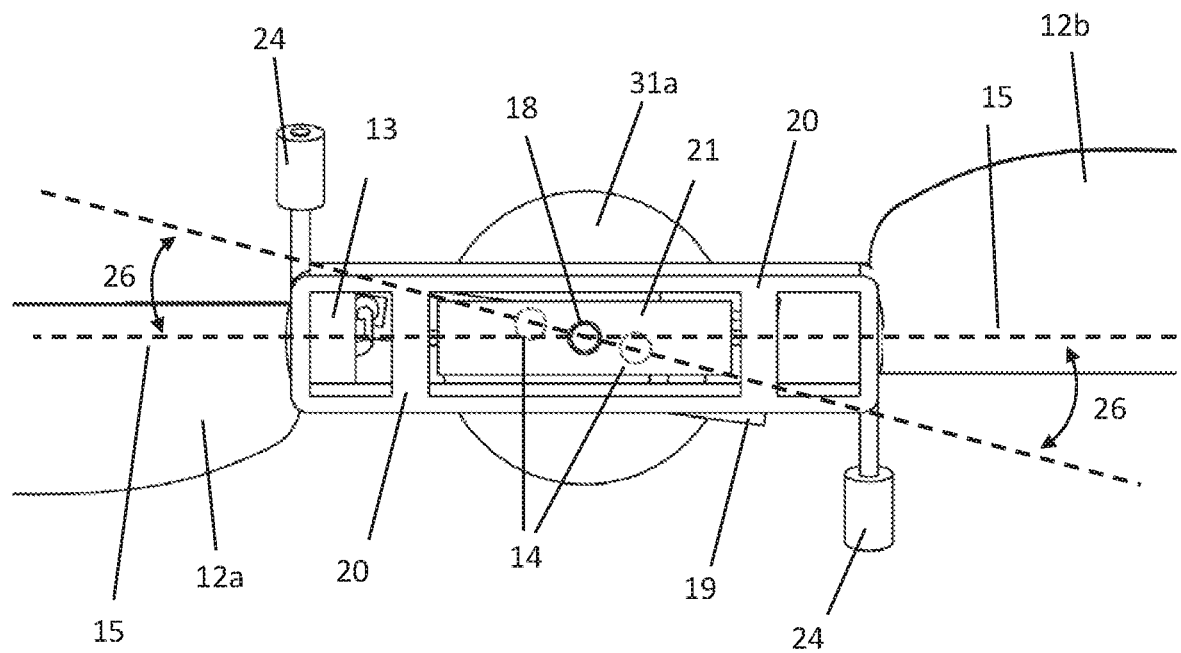
FIGS. 4a and 4b illustrate the thrust-generating rotor assembly from above and the side with positive pitch and a "rapid" positive alteration in torque according to one embodiment of the present invention.
Figure 4B:
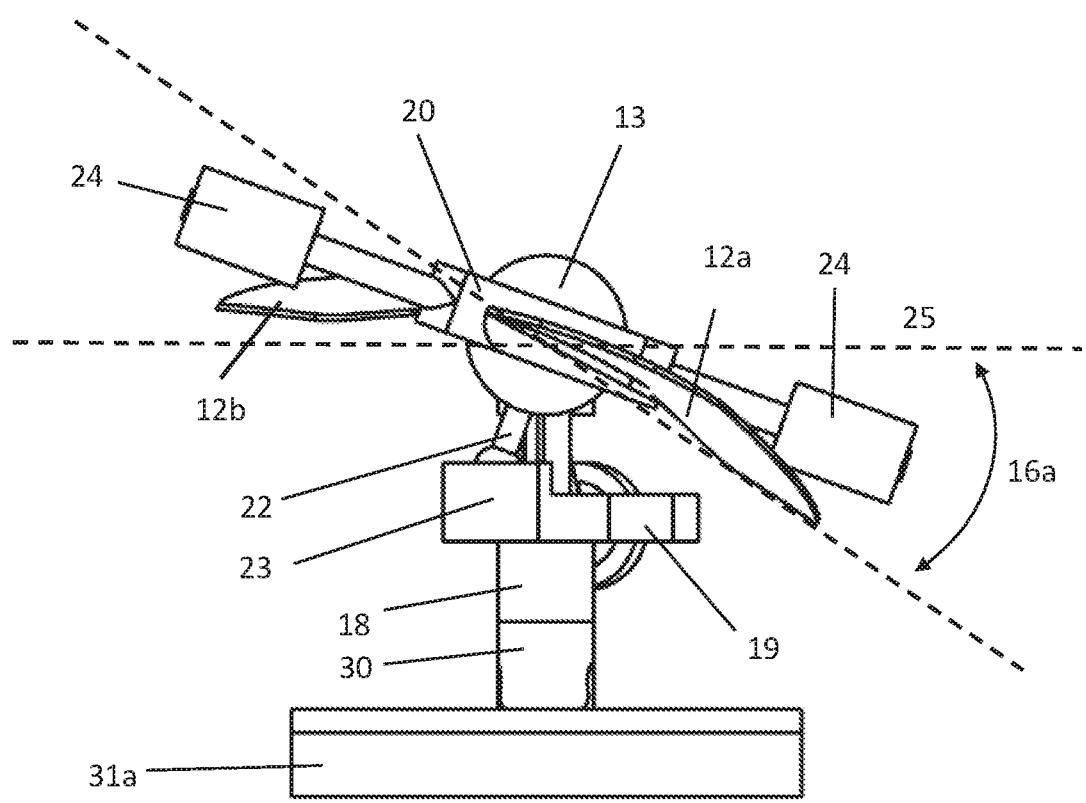

A Rapid Positive Alteration in Torque, FIGS. 4a and 4b

To increase the blade pitch angle 16a on a first rotor blade 12a from a nominal blade pitch angle 16, a rapid positive alteration in torque is applied from the motor 31. Compared to the rotor blade assembly 11, the rotor torque assembly 10 has low rotational moments of inertia and is connected to the rotor blade assembly 11 by spring members 14 and a pitch arm 22. This enables the motor 31, to slightly, and almost instantly, increase the rotational speed of the rotor torque assembly 10 when additional torque is applied.

Since the rotor blade assembly 11 is not rotationally fixed to the rotor head 19, but instead relies on the spring members 14 to transfer the rotor torque from the rotor torque assembly 10, and since the rotor blade assembly 11 has a much higher rotational moments of inertia, its acceleration becomes slower. A result of the slower acceleration is that the rotor blade assembly 11 will start to lag behind compared to the rotor torque assembly 10. This difference in rotational position is previously defined as the rotational offset 26.

With a rapid increase in torque from the motor 31, the increase in rotational offset 26 starts to build up within a fraction of a revolution. Since the alteration in torque is rapid, and the pitch arm 22, in this example embodiment, is connected to the inner concentric part 13a of the pitch damper 13 in its upper end, and to the pitch arm connection 23 in its lower end, the pitch arm 22 will have to tilt to accommodate the increased rotational offset 26. Now, looking at the pitch damper 13 and keeping in mind that the alteration in speed and rotational offsets is rapid, it may, based on previous descriptions of the characteristics of the pitch damper 13, be understood that the second, outer concentric part 13b of the pitch damper 13, and thereby also the rotor blade assembly 11, will generally follow the movement of the first concentric part 13a and the tilting of the pitch arm 22.

The rotational offset 26 and the tilting of the pitch arm 22 will, however, not happen instantaneously because of the inertia forces resulting from the stabilizing flybars 24 acting about the rotor blade axis 15. In the initial phases of building up a rotational offset 26, not all of the torque transferred to the rotor blade assembly 11 will go through the spring members 14. Some of the force will instead act through the pitch arm 22, resulting in the following. Firstly, the forces acting from the upper end of the pitch arm 22 through the pitch damper 13 will, until the pitch arm 22, the pitch damper 13 and rotor blade assembly 11 is actually tilted, contribute to a small acceleration in the rotational speed of the rotor blade assembly 11. Secondly, the same force will, however, at the same time create a tilting moment about the rotor blade axis 15, starting to tilt the rotor blades 12, countered by the inertia forces resulting from the stabilizing flybar 24 and differences in aerodynamic forces acting on the two rotor blades 12a, 12b. As the rotor blades 12, pitch damper 13, flybars 24 and the pitch arm 22 tilt, the rotational offset 26 increases. Further, as the rotational offset 26 increases, the spring members 14 deform and bend more and more, transferring a larger part of the increased torque from the rotor torque assembly 10 to the rotor blade assembly 11. When the rotor blades in the rotor blade assembly 11 tilt as described, the lower end of the pitch arm 22 moves forward in the direction of rotation, and the first rotor blade 12a tilts up, resulting in a higher blade pitch angle 16a. Since the two rotor blades are rigidly mounted together, the oppositely pointing rotor blade 12b will experience a decrease in blade pitch angle 16. The increase and decrease in blade pitch angle 16, and increase in rotational offset 26, continues until all of the increase in rotor torque, the positive alteration in torque, goes through the spring members 14.

To have sufficient control over how much the blade pitch angle 16 increases and how long time it takes to reach a maximum, it is preferred to match the level of alterations in torque to the rotational moments of inertia of the rotor blade assembly 11, the properties of the spring members 14, and the inertia of the flybars 24. A heavy rotor blade assembly 11 requires larger aerodynamic forces to tilt the rotational plane 25 and therefore typically needs a higher change in torque, with a corresponding change in blade pitch angle 16, compared to a lighter rotor blade assembly 11. Flybars 24 with high mass and stiff spring members 14 typically require a higher change in torque, while flybars 24 with low mass and soft spring members 24 require a lower change in torque.

The weight, i.e. inertia, of the flybars 24 also influences the timing. Heavy stabilizing flybars 24 result in a longer time from when a change in torque is initiated until the maximum change in blade pitch angle 16 is reached. Heavy and/or long flybars therefore require the motor control system 31 to start the increase in torque earlier in the rotation than would have been the case for a rotor blade assembly 11 with smaller or no flybars.

To conclude, a rapid increase in torque creates an increased blade pitch angle 16a in a first rotor blade 12a and a decreased blade pitch in the oppositely pointing blade.

Figure 5A:
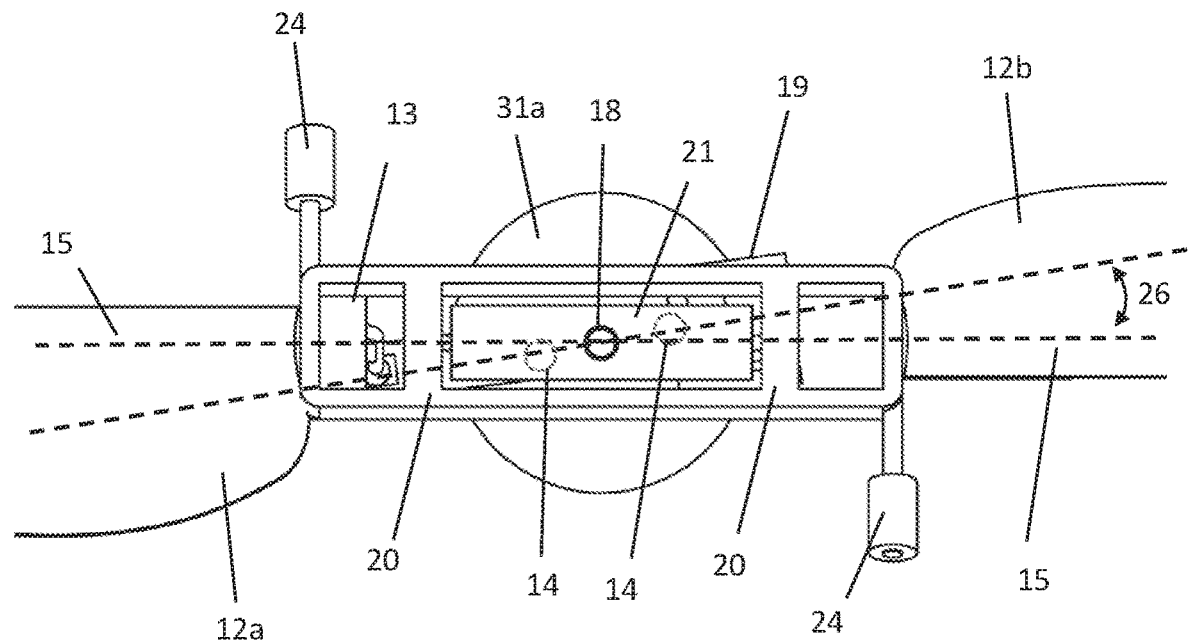
FIGS. 5a and 5b illustrate the thrust-generating rotor assembly from above and the side with negative pitch and a "rapid" negative alteration in torque according to one embodiment of the present invention.
Figure 5B:
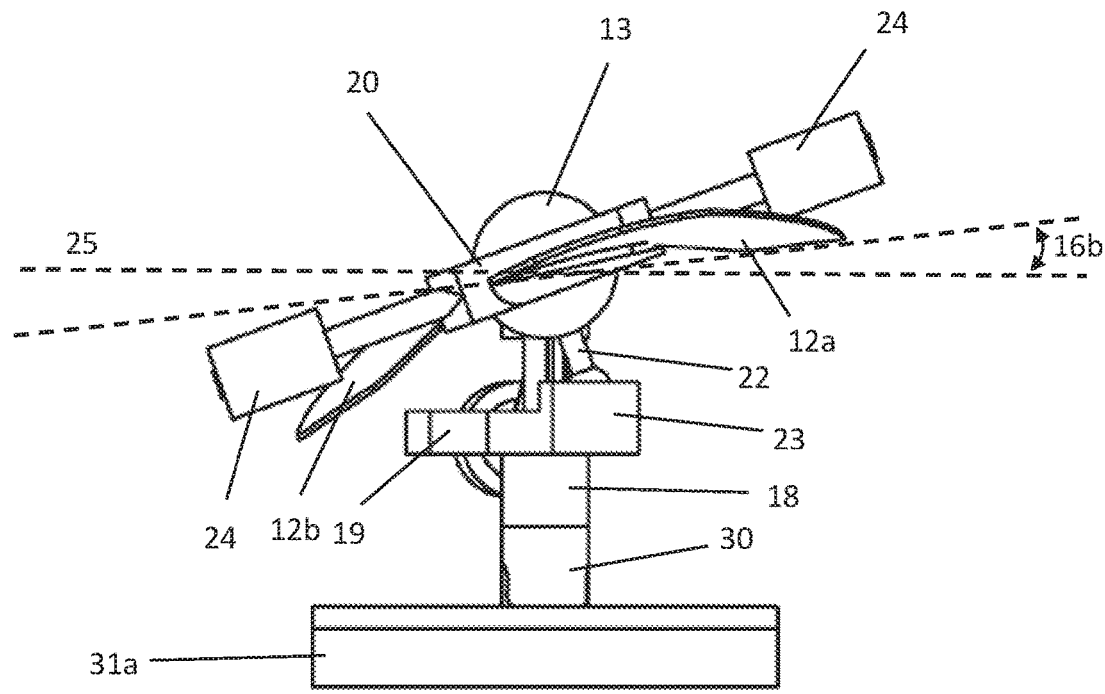

A Rapid Negative Alteration in Torque, FIGS. 5a and 5b

To reduce the blade pitch angle 16a on a first rotor blade 12a from a nominal blade pitch angle 16, a rapid negative alteration in torque is applied from the motor 31. In this case, the large rotational moments of inertia of the rotor blade assembly 11 results in a negative change in the rotational offset 26. The rotor blade assembly 11 will need some time to slow down, while the rotor torque assembly 10 starts reducing the rotational speed immediately. The time needed to slow down the rotor, results in the rotor blade assembly 11 starting to move ahead with respect to the rotor torque assembly 10.

Looking at the spring members 14, the stabilizing flybars 24, the pitch damper 13 and the pitch arm 22, the opposite action of what happened during a positive alteration in torque is now taking place.

Because the alterations in torque is rapid, the second concentric 13b part of the pitch damper 13 will, due to the properties of the damping material, generally follow the movement of the first concentric part 13a and the pitch arm 22. Thereby, as the rotational offset 26 starts to go down, the lower end of the pitch arm 22 is pulled back from its current position. Again, because of the stabilizing flybar inertia, the rotor blade assembly 11 and the pitch arm 22 will not be allowed to immediately tilt. The forces acting thorough the pitch arm 22 will instead set up a tilting moment about the rotor blade axis 15, i.e. start to tilt the rotor blade assembly 11 in a negative direction. As the rotor blades 12, the flybars 24, the pitch damper 13, and the pitch arm 22 tilts, the rotational offset 26 decreases, or becomes negative.

When the rotor blade assembly 11 tilts as described, while the lower end of the pitch arm 22 moves backward relative to the direction of rotation, the first rotor blade 12a tilts down, ending up having a lower blade pitch angle 16b. The oppositely pointing rotor blade 12b will on the other hand end up with a higher blade pitch angle 16b. The reduction, and increase, in blade pitch angle 16 and decrease in rotational offset 26 continues until the decrease in rotor torque, i.e. negative alteration in torque, again is balanced by the spring members 14.

To conclude, a rapid reduction in torque creates a decreased blade pitch angle 16b of a first rotor blade 12a and an increased blade pitch in the opposite pointing blade.

Figure 6A:
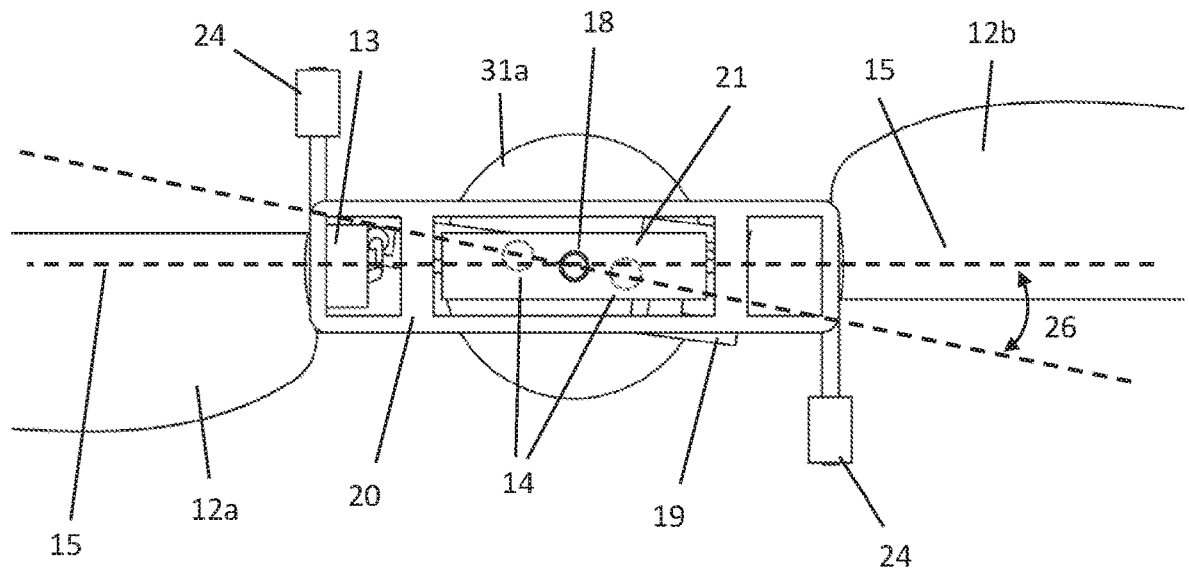
FIGS. 6a and 6b illustrate the thrust-generating rotor assembly from above and the side with nominal pitch and a very "slow" alteration in torque according to one embodiment of the present invention.
Figure 6B:
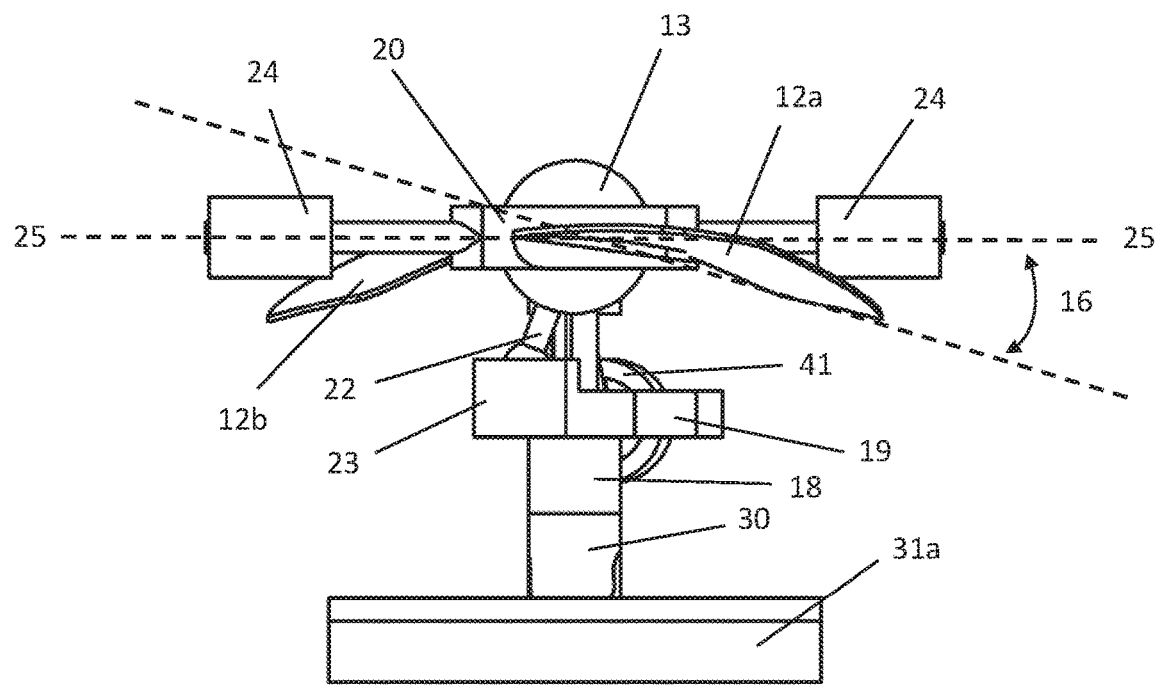

A Slow Alteration in Torque, FIGS. 6a and 6b

The difference between a rapid and a slow alteration in torque may be demonstrated in the way the pitch damper 13 reacts to the different rates of change. As described above, a rapid change in torque leading to a rapid change in rotational position or speed of the first concentric part 13a of the pitch damper 13 causes the second concentric part 13b to follow the movements of the first part. If, however, the change is slow, the properties of the pitch damper 13 will allow the second concentric part 13b to slip and not follow the movement of the first concentric part 13a if a force is acting against this movement. The relative movements between the two concentric parts may then greatly differ.

If the alteration in torque is rapid, the force transferred through the pitch damper 13 is large enough to overcome the stabilizing inertia forces, from e.g. the flybars 24, and start tilting the rotor blades 12. If, however, the alteration in torque is slow, the second concentric part 13b of the pitch damper 13 will start to slip instead of transferring tilting forces to the rotor blades 12. A damping member offset is obtained and less force is transferred. In this case, the force acting on the pitch arm 22 is not large enough to overcome the stabilizing forces. The rotor blade assembly 11, the flybars 24, and thereby the blade pitch angle 16 will remain generally unchanged or at least quickly regain a balanced level state.

In FIGS. 6a and 6b a situation with a slow increase in rotor torque is shown. The only difference between this situation and the nominal state is that the spring members 14 are slightly more twisted or bent in response to the larger torque and increased aerodynamic drag. The rotational offset 26 is slightly bigger than the nominal offset, however the remaining structure is level and in balance. This situation is identical to a situation where a fast positive change in torque has become permanent, resulting in increased rotational rotor speed. If the state of increased torque becomes permanent, the torque is countered only by the aerodynamic drag on the rotor blades 12 and no inertia forces are active.

The slow alteration in torque described above, is a very slow alteration, taking place over a large number of rotor revolutions. In practical situations, the changes could very well be faster, but still defined as slow. In such a case, the pitch damper 13 will only slip a little, and still transfer some amount of force from the pitch arm 22. The rotor blades 12 will experience a small constant offset in blade pitch angle 16. If the change in torque is positive, the blade pitch angle 16a of the first rotor blade 12a will be slightly increased and the blade pitch angle of the opposite blade will be slightly lower, until the rotor again levels out and is stabilized. A slow negative change will have the opposite effect on the blade pitch angle 16.

To conclude, a slow alteration in torque will typically lead to a change in rotational speed of the rotor, but only to minor, and not permanent, changes in blade pitch angle 16.

Control of an Aircraft Through Alternations in Torque

Controlling the horizontal movements of a helicopter or rotary wing aircraft requires changes in blade pitch angle as described above, but these changes are preferably applied carefully at the correct position in the rotational plane to obtain the desired effect.

To initiate e.g. a forward movement, it is necessary to, over some time, cyclically increase the lift of the rotor blades 12 to tilt the rotor disk and eventually the aircraft forward. Consequently, the initially vertical thrust used to sustain the aircraft gets a horizontal component that in turn pulls the aircraft forward. This way, the aircraft may be controlled in all horizontal directions by increasing the lift in desired positions in the rotor's rotational plane 25.

Under such conditions, the changes in blade pitch angle 16 are cyclic. This means that for a given control command the maximum blade pitch angle 16 may preferably occur in the same position, in several consecutive revolutions of the rotor. While observing a rotor blade 12 through a revolution, it may be seen that the blade goes through a cycle of maximum blade pitch angle in one position, to a minimum pitch angle after 180 degrees—and back up to a maximum after a full revolution. Since the two rotor blades 12 in the rotor of the example embodiment of the present invention are rigidly connected and pointing in opposite directions it will be obvious that when one rotor blade 12 has a maximum blade pitch angle 16 the opposite blade will have a corresponding minimum angle.

In one embodiment, a motor controller 33 configured to provide these cyclic changes in blade pitch angle 16 uses a repetitive sequence of rapid positive and negative alterations or alternations in torque according to the present invention. To be able to apply the positive and negative changes in rotor torque correctly, it is preferred that the motor controller 33 knows the position of the rotor blades 12 as the rotor rotates. Since the rotational offset 26 is small compared to a full revolution, one may estimate the rotor blade position based on the nominal torque and the rotational position of the rotor torque assembly 10 and the motor 31. This is done by virtue of a rotational sensor 32 as previously explained. Purely as an example, the rotational sensor 32 can register every time a certain position of the motor 31 passes the sensor. Further, by monitoring the time between when the rotational sensor 32 registers a revolution, the motor controller 33 can calculate a precise position of a rotor blade 12 throughout the next revolution. When the motor controller 33 combines the input from the pilot with the calculated position of the rotor blades 12, it can determine exactly when to apply a change in torque and the amount of change necessary to control the aircraft.

Depending on the rotational speed, the rotational moments of inertia, and the properties of the stabilizing flybar 24, the changes in torque may preferably be applied some time before a change in blade pitch angle 16 is required. The exact advance in time may be determined through calculations, simulations, or through practical tests with a fully functional rotor and control system. After the rotor blades 12 have changed their blade pitch angle 16 it also takes additional time before the rotor disk is actually tilted. This effect is called gyroscopic precession and introduces an additional delay in response that may be up to 90 degrees later in the rotation. The necessary advance in torque-change to account for both these factors is controlled by the motor controller 33.

To control the aircraft in a vertical direction, a slow or permanent change in rotor torque is applied until the rotational speed and thereby the thrust from the rotor has changed as required to control the vertical speed of the aircraft.

Resonance and Oscillations in the Rotor Assembly

An important aspect of the present invention is that spring and damping members of the rotor assembly are carefully adjusted with respect to the rotational moments of inertia of the rotor's subassemblies. In combination with precise control of both the motor position and torque throughout each revolution, this may be used to utilize a so-called resonant gain to improve the response of the rotor. The effect of this resonant gain is to increase the oscillating rotational movements of the rotor torque assembly for a given cyclic change in torque from the motor, i.e. the cyclic variations in the rotational offset is increased compared to a system that is not operating in resonance.

Having resonant oscillations in a thrust generating rotor assembly is, however, considered to be very problematic and has therefore previously been avoided in the industry. Resonance in the rotor blades themselves or between the rotor and the rest of the aircraft can easily get out of control and lead to large vibrations and increasing self-induced oscillations. Eventually, this could end in loss of control of the aircraft and complete structural breakdown.

There are many challenges associated with utilizing this resonance in the rotor blades or in the rotor blade assembly, and it is therefore not implemented in conventional rotor systems. Firstly, due to the added weight and complexity there are typically no measurement systems installed on the rotor head able to measure the actual oscillations of the rotor blades. This represent a major challenge because, if one tries to operate the rotor blade pitch movements in resonance, the blade pitch angle will heavily depend on the physical conditions of or on the rotor (e.g. aerodynamic damping, bending or twisting of rotor blades) and not only changes in motor speed and torque. In other words, since there is no measurement system and no direct control over the oscillations in the parts where resonance occurs, it is typically difficult in conventional systems to control the level of resonant gain as well as the effect this has on the blade pitch angle.

The present invention, however, provides a controllable and predictable way of utilizing resonance, thereby enabling a torque controlled rotor system to operate more efficiently without adding complexity and cost. Before discussing resonant characteristics and operation of an example embodiment of the present invention, resonance will be briefly described.

Characteristics of Resonance

Resonance is a phenomenon that occurs when a vibrating system or an external force drives another system to oscillate with greater amplitude in a specific frequency range. Frequencies at which the response amplitude has a relative maximum are known as the system's resonant frequencies or resonance frequencies. At resonant frequencies, small periodic driving forces have the ability to produce large amplitude oscillations. This is because the system stores and releases vibrational energy. Resonance occurs when a system is able to store and easily transfer energy between two or more different storage modes, such as kinetic energy and potential energy in the case of a pendulum. However, in normal operating conditions some loss occurs from cycle to cycle, known as damping. When damping is small, the resonant frequency is approximately equal to the natural frequency of the system.

All structures have mass, stiffness, and damping that influence their natural frequency and the characteristics of resonance. In assemblies, all connected parts influence the natural frequency of the assembly. Natural frequency is the point where the amplitude of the oscillating vibrations peak, and where they may become self-sustaining in a system with little damping, i.e. a frequency of unforced vibrations. However, if the frequency, or the rotational speed, of the driving force is increased above the point of natural frequency, the amplitude of the vibrations will start to decrease until they provide no danger to the structural integrity.

The natural frequency of a body may be expressed by the following equation:

$$f_R = \frac{1}{2\pi}\sqrt{\frac{k_S}{I_S}}$$

where $f_R$ is the natural frequency in Hz, $k_S$ is the stiffness in the resonant system and $I_S$ is the moment of inertia of the system. Stiffness refers to the flexible qualities of the materials in the system. As can be seen from the equation, increased stiffness will raise the natural frequency, making it occur at a higher frequency (in this context rotational speed) of the driving system. Increased inertia may on the other hand lower the frequency, making it occur at a lower frequency of the driving system.

Figure 9A:
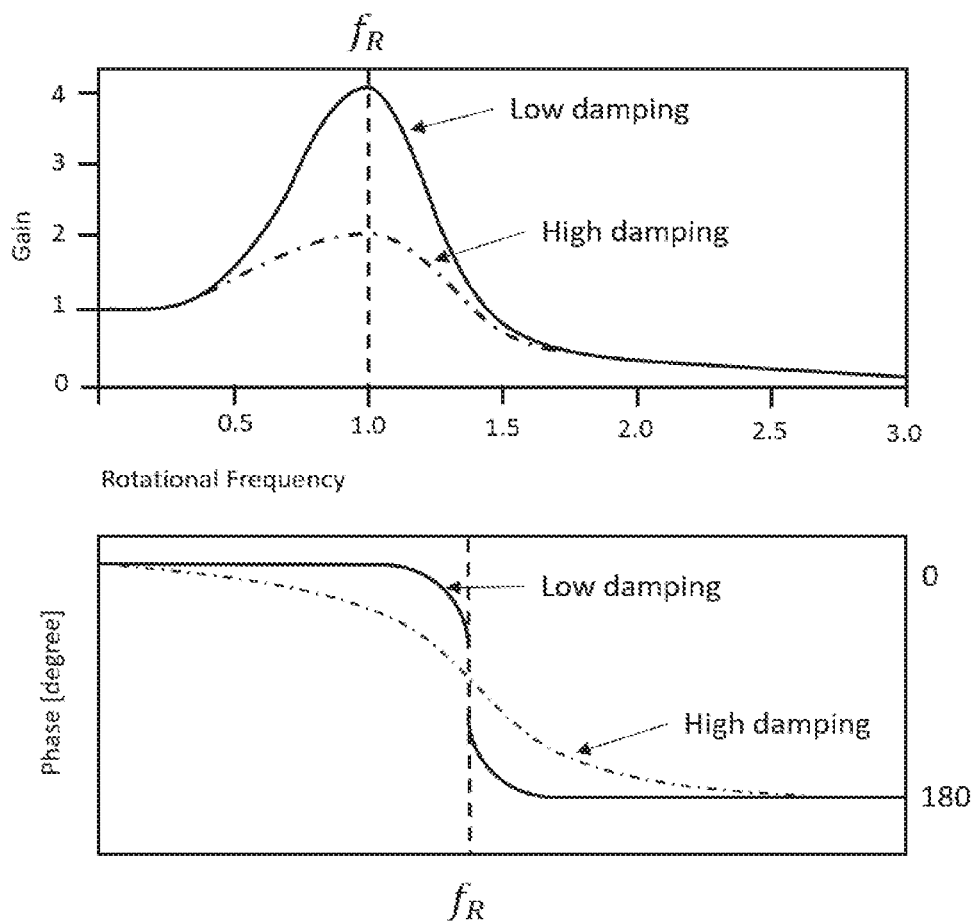
FIG. 9a illustrates resonance frequency and the effect of damping on a resonance system in relation to gain (upper) and phase lag i.e. the delay in response (lower).

The upper diagram in Graph A (e.g., see FIG. 9a) illustrates the amplitude of an oscillation as a function of an increasing frequency, rotational speed, of the driving force. At $f_R$, the natural frequency of the illustrated system, the amplitude of the response has a maximum that depends on the damping in the system. Damping is absorption of vibratory energy and may in a simple system only be loss of energy to the environment, or it may be a property of materials or specially adapted structures. One example is the dampers of a car driving over a speed bump. Without the dampers, the cars suspension will, due to the mass of the car and its springs, continue to oscillate for a long time until all the energy is lost to the environment. However, by including a damper in the suspension, the motion is stopped after a few cycles. By adjusting the characteristics of the damper one may reduce or increase the maximum amplitude of the vibrations at resonance, in this analogy how much the car will move up and down.

Referring to the lower diagram in Graph A (e.g., see FIG. 9a), another important aspect of resonant behavior is illustrated. As the driving frequency increases and gets closer to the systems natural frequency, the response amplitude starts to "lag behind" the driving force, so-called phase lag. In other words, for a rotating system, the response to a driving force does not occur immediately, but instead later in the rotation. The closer to the resonant frequency, the longer it takes for the response to reach its maximum. At the resonant frequency the phase lag is about 90 degrees, one quarter of a rotation later. For clarification, this is in relation to a resonant system and is not the same as the delay caused by gyroscopic precision of a rotating rotor blade assembly as discussed earlier. If the driving frequency continues to rise, the phase lag continues to increase, until, at high driving force frequencies, i.e. high rotational speeds, the maximum amplitude of the response is delayed almost 180 degrees, one half rotation. When the response lags like this, the vibrating energy will in present embodiments first be stored in the systems springs, by bending or twisting the structure, and then released as movements a number of degrees later in the cycle or rotation.

The resonant characteristics discussed above also influence the resonant operation of the example embodiments described herein.

Utilizing Resonance in a Controlled Manner

The following section describes how to present embodiments, in a controlled manner, maximize the rotational offset 26 for a given cyclic change in torque by utilizing rotational resonance of the rotor torque assembly 10.

In one embodiment, the rotating part of the motor 31a is included in the rotor torque assembly 10. It is this, the combined rotor torque assembly 10, which is provided to operate in resonance. The advantage is that the system may relatively easily provide full control over all factors that influence the resonant oscillations, as to be explained.

There are, however, some design criteria that ensure the rotor behavior according to the present embodiment. The rotor blade assembly 11 may be provided with a rotational moments of inertia about the rotor shaft axis that is several times higher, e.g. four to ten times higher, than that of the rotor torque assembly 10. Alternatively, the rotor blade assembly 11 may be provided with a rotational moments of inertia that is ten to twenty times higher, than that of the rotor torque assembly 10. As with torque dependent blade pitch control, it is still important to ensure that the rotational speed of the rotor blade assembly 11 is relatively constant compared to that of the motor 31 and the rotor torque assembly 10. Since accurately measuring variations in rotational speed of the rotor blade assembly 11 is difficult, fulfilling this condition may simplify the control over the rotor and also increase the control performance. As previously explained, some small alterations in rotational speed will happen in response to an altered torque, but these are minor and over time one may assume that the rotor blade assembly 11 spins at an approximately constant speed, while the speed of the rotor torque assembly 10 and the motor 31 varies.

With the speed of the rotor blade assembly 11 being relatively constant, and for simplification not taking the effect of the flybars 24 and the rotor blade assembly's tilting moments of inertia about the blade pitch axis 15 into account, one may now see that the natural frequency of the rotating rotor torque assembly 10, i.e. the natural frequency of the cyclic variations in rotational speed of the assembly, is determined by the formula earlier described:

$$f_R = \frac{1}{2\pi}\sqrt{\frac{k_{MR}}{I_M}}$$

where $f_R$ is the natural frequency in Hz of the rotor torque assembly 10, $k_{MR}$ is the stiffness in the resonant structure, in this case the spring member 14 between the rotor torque assembly 10 and the rotor blade assembly 11, and $I_M$ is the rotational moments of inertia about the rotor shaft axis for the rotor torque assembly 10, including the moments of inertia of the rotating part of the motor 31a. This formula, or preferably more advanced simulations and practical tests, may be used to adjust and tune the spring member 14 against the moments of inertia $I_M$ to provide a rotational resonant frequency range of the rotor torque assembly 10 within a range of rotational frequencies of operation for the rotor. Further, increasing the tilting moments of inertia of the rotor blade assembly 11 about the pitch axis 15 will generally lower the resonant frequencies, while only increasing the weight or the length of the flybars 24 may instead increase the resonant frequencies. The effect of the tilting moments of inertia about the blade pitch axis 15 and the flybars 24 is difficult to calculate precisely, and may preferably be determined through simulations or tests.

Figure 9B:
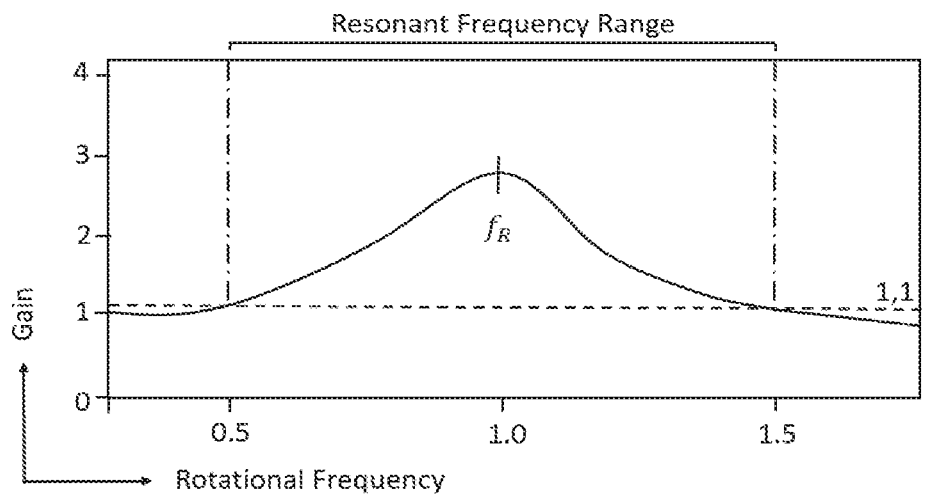
FIG. 9b illustrates an example of a resonant frequency range of an embodiment with a response gain above 1.

During operation, the rotational sensor 32 will closely monitor the position of the motor throughout each revolution. Any cyclic changes in rotational speed are now equal to the amplitude of the response as illustrated in Graph B below (e.g., see FIG. 9b). As the motor and rotor reach a rotational speed approaching the natural frequency, $f_R$, one will observe that, for a given cyclic change in driving torque from the motor 31, the corresponding cyclic change in rotational speed of the rotor torque assembly 10 will increase. In other words, a resonant gain of more than 1.

Since the cyclic changes in rotational speed, i.e. the amplitude of the resonance, can be closely monitored by the rotational sensor 32, and the motor controller 33 provides full control over both the instant and the average torque produced by the motor 31, embodiments are able to precisely and carefully control the cyclic changes in the rotor torque assembly 10, hence also the rotational offset 26, even when operated in resonance. By utilizing the resonant gain, embodiments disclosed herein are able to achieve rotational offsets 26 several times higher than what would have been possible in a comparable non-resonant system. Consequently, the aircraft may employ smaller motors, giving room for larger payloads, alternatively being capable of higher flight speeds or fly in conditions with more wind and gusts compared to an aircraft with the same motor and a non-resonant operating system.

In a practical system, and to allow for the motor controller 33 to maintain a predictable level of rotational offset 26, embodiments may employ an additional damping member, the torque damper 41, connected in parallel to the spring member 14. The torque damper 41 is configured to dampen the relative movements between the rotor torque assembly 10 and the rotor blade assembly 11. In other words, it controls the resonant gain factor and prevents the system from becoming unstable.

Below, the torque damper 41 is described in detail as well as how embodiments are adjusted for resonant operation and how this is controlled.

Embodiments Configured for Resonant Operation

Again referring to FIGS. 1a through 2b and keeping in mind the descriptions of the rotor blade assembly 11 and the rotor torque assembly 10 from earlier, it may be observed that in addition to the pitch damper 13, embodiments employ a second damper, the torque damper 41. The design and damping characteristics of the torque damper 41 may be similar to that of the pitch damper 13 previously described in detail.

In one embodiment, the torque damper 41 includes a first concentric part 41a and a second concentric part 41b adapted to rotationally fit within each other. The torque damper 41 further incorporates a desired damping material filling a predefined gap between the first and second concentric parts. Viscous properties of the damping material may be chosen to limit, or substantively reduce, movement of the second concentric part 41b with respect to the first concentric part 41a when there is a rapid change in their relative rotational speed, or position. At the same time, the viscous properties of the damping material allow larger movement of the second concentric part 41b with respect to the first concentric part 41a if the changes in rotational speed or position are slow.

In the present example embodiment, the first concentric part 41a of the torque damper 41 is adjusted to fit inside, and rotate inside, the second concentric part 41b, like a rotating member inside a housing. The second concentric part 41b of the torque damper 41 constitutes the housing. The housing is fixed to an outer end of the rotor head 19, positioned opposite to the pitch arm connection 23, and with its rotational axis perpendicular to the rotor shaft axis. Furthermore, a torque arm 42 is in its lower end fixed to the first concentric part 41a of the torque damper 41 and extends vertically upwards. In its upper end the torque arm 42 is connected to the rotor blade assembly 11 through a torque arm connection 43 mounted to the central member 21 at a predetermined distance from the rotor shaft axis.

The torque damper 41, the torque arm 42 and the torque arm connection 43 may, purely as an example, be designed and built of materials similar to those described earlier for the pitch damper 13, the pitch arm 22 and the pitch arm connection 23 respectively.

The function of the torque damper 41 is to control the level of rotational movements between the rotor torque assembly 10 and the rotor blade assembly 11, or in other words dampen the rate of change in the rotational offset 26. In various embodiments this is achieved when a change in rotational offset 26 causes the torque arm 42 to tilt, thereby forcing the first concentric part of the torque damper 41 to rotate with respect to the second part. When the damping fluid inside the torque damper 41 prevents or slows down this movement, a force is experienced, that through the torque arm 42 and the torque arm connection 43, works against the change in rotational offset, dampening the movement.

It is important that the dampening effect of the torque damper 41 is not too high, slowing down or preventing wanted cyclic changes in the rotational offset 26, but only limit rotational offsets that are too high or uncontrollable as the rotor reaches a rotational speed close to the natural frequency of the rotor torque assembly 10. The torque damper 41 thereby controls the level of resonant gain in the system. Typically, the torque damper 41 may be adjusted to provide a resonant gain factor of between 1.1 and 4.

Alternative embodiments of the present invention may utilize different configurations and positions for the torque damper 41 while still employing the same function as described herein. For example, the torque damper 41 may be excluded, leaving it to the motor controller 33 to carefully control and reduce the torque from the motor when the system operates close to the resonant frequency, to achieve the correct level of cyclic changes in rotational offset 26.

Further, the spring member 14 is typically the easiest part to adjust and tune in order to position the natural frequency of the rotor torque assembly 10 at a desired point of operation. Increasing the stiffness of the springs increases the resonant frequency range, alternatively softer springs lower the frequencies. A softer spring member 14 will normally also result in larger rotational offsets 26 for a given torque input. Typically, the system will be tuned to position the natural frequency, i.e. the point of highest gain, close to the point where the aircraft is operated most of the time, e.g. close to hover RPM in the case of a helicopter, in Graphs A and B indicated at 1.0 (e.g., see FIGS. 9a and 9b). Alternatively, the range of resonant frequencies may be shifted, e.g. to have a system where the gain is higher at higher rotational speeds in order to use less of the motors 31 torque to create cyclic changes and more of it to drive the rotor at higher rotational speeds. To benefit from resonant gain, the resonant range of frequencies, the range wherein the gain factor is above a certain value, e.g. 1.1, should at least partly fall within the range of rotational frequencies, or the RPM range, for typical operation of the rotor.

Since the spring member 14 also has the function of transferring torque to the rotor blade assembly 11 and accommodating cyclic changes in rotational offset 26 for blade pitch alterations, there are limitations to how much the characteristics of the spring member 14 may be altered. Because of these limitations, it might also be necessary to increase or decrease the rotational moments of inertia of the rotor torque assembly 10 or the tilting moments of inertia of the rotor blade assembly 11 about the rotor blade axis 15 to provide a rotational resonant frequency range of the rotor torque assembly 10 within the range of rotational frequencies of operation wanted for the rotor.

The spring member 14 may take several shapes and configurations, and may be constructed from different materials as earlier discussed in relation to torque dependent blade pitch control.

Referring to FIGS. 2a and 2b, the control aspects of the resonant operation may be discussed in more detail. According to the present embodiment any suitable electric motor 31 that allows for the level of management described may be used to drive the rotor. The embodiment illustrated in FIGS. 2a and 2b is adapted for an out-runner motor, as shown. Here, the outer part, the rotating part 31a of the motor 31, employs a ring of permanent magnets mounted to a housing and a shaft. The rotating part is rotationally connected to an inner part, the static part 31b of the motor 31. The static part 31b is equipped with electromagnets configured to generate torque driving the rotating part 31a. The current in the electromagnets, hence the generated torque, is controlled by the motor controller 33.

One known in the art will acknowledge that a redesign of the motor connection 30 may have to be undertaken to accommodate a different motor type. Regardless of the type selected, all types of electric motors have ranges that will involve vibrations and resonance at certain rotational speeds. If, however, a geared motor is used, the calculation of the combined rotational moments of inertia for the rotor torque assembly 10 will have to take the gear ratio into account.

The rotational sensor 32 and the motor controller 33 discussed herein may also be used to control the additional effects of a resonant operation, in addition to account for gyroscopic precession and similar delaying effects in the rotor blade assembly itself, as previously explained in relation to phase lag and control of the rotor through torque.

There are two slightly different ways the motor controller 33 may control the rotor during resonant operations. According to one embodiment, the rotational sensor 32 may be used to closely monitor the rotation of the motor 31 and the rotor torque assembly 10, and motor controller 33 may be configured to adjust the current going to the static part 31b of the motor 31 to provide control of the speed and position of the rotor torque assembly 10. If the rotational sensor 32 is accurate enough and the motor controller 33 is fast enough, it is possible to compensate for both the phase lag and for the gain factor as the rotational speed changes, solely based on input from the rotational sensor 32. Alternatively, the motor controller 33 may utilize previous knowledge of the gain versus frequency and the phase lag versus frequency to predict the resonant behavior of the rotor torque assembly 10, thereby being able to provide control with less accurate position information and through a slower operating motor controller 33. According to both alternatives, the result of the resonant operation is similar.

To summarize: If the system according to the present embodiment is operated close to the resonant frequency, i.e. the rotational speed of the rotor is close to the natural frequency of the rotor torque assembly 10, the necessary cyclic changes in torque to obtain a certain change in blade pitch angle 16 may be reduced with a factor equal to the resonant gain factor at this frequency. In other words, the motor 31 may vary the torque less than it would have to do if not operated in resonance. Thereby, more of the motors total available torque may be used to sustain the aircraft employing the disclosed rotor system. Moreover, if disclosed embodiments operate close to the resonant frequency, the phase lag is close to 90 degrees. This implies that the motor 31 needs to shift any cyclic changes in torque about 90 degrees, or one quarter of a revolution, ahead of when the corresponding change in rotational offset 26, and change in blade pitch angle 16, is needed in order to control the aircraft.

Apart from the motor controller 33 taking resonant gain and phase lag into consideration when applying control inputs to the motor 31, resonant operation of the example embodiment is equal to operation of a torque dependent rotor blade pitch control system described earlier in this document.

ALTERNATIVE EMBODIMENTS

First Alternative Embodiment

Figure 7A:
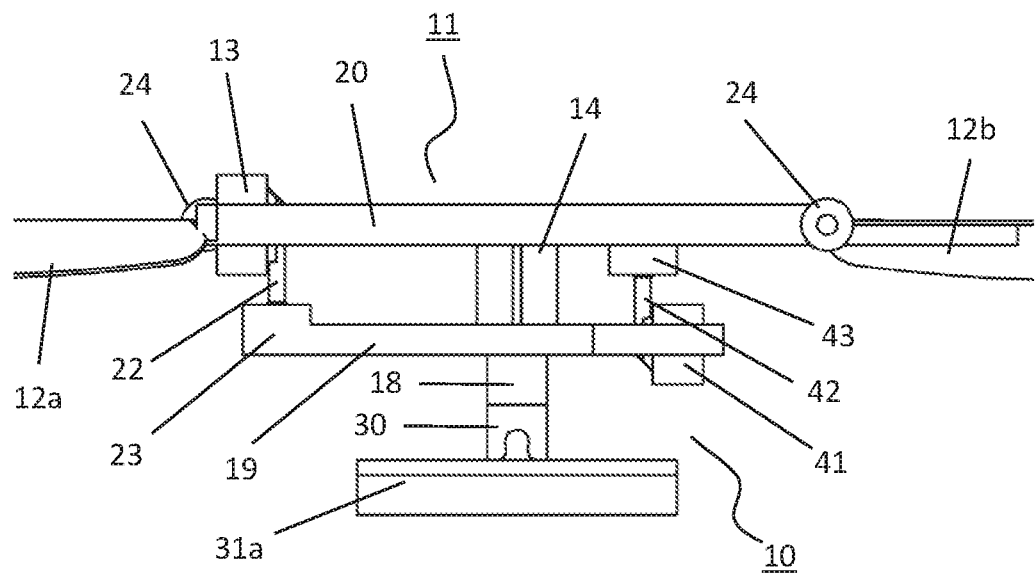
FIGS. 7a and 7b illustrate a first alternative thrust-generating rotor assembly from the front in a plan view and in a plan cut-through view according to one embodiment of the present invention.
Figure 7B:
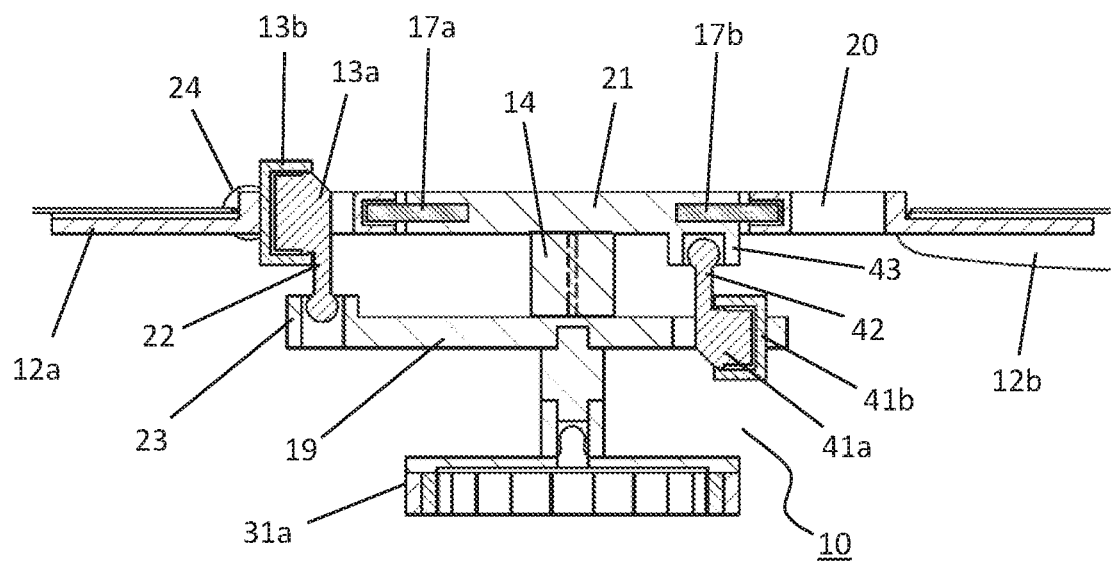

A first alternative embodiment of the present invention is discussed with reference to FIGS. 7a and 7b. In this first alternative embodiment, the upper part of the rotor shaft 18 and the two spring members 14 described in embodiments above are combined into one member. This new single spring member 14 is adjusted to function as a structural part replacing the rotor shaft 18 in positioning and supporting the central part 21 of the rotor blade assembly 11, as well as to function as a single torsion spring replacing the two parallel spring members 14 earlier discussed.

In this first alternative embodiment, the spring member 14 also absorbs all aerodynamic and inertial forces, e.g. thrust and gyroscopic forces from the rotor blade assembly 11 and transfers them to the rotor torque assembly 10 and eventually to the rest of the aircraft. The spring member 14 may have many different shapes; in an alternative embodiment it has a cross section formed like a cross or a plus sign. The purpose of this design is to maximize the bending stiffness to support the rotor blade assembly 11 while at the same time lowering the torsion stiffness to obtain the desired spring stiffness ($k_{MR}$) in relation to resonance. The spring member 14 is preferably built of a material with mechanical properties that allow the spring to have a linear characteristic over the operating temperature range, is durable and stiff enough to transfer the necessary forces and can withstand a large number of repeated twisting oscillations. As an example, the spring member 14 may here be built from a fiber composite, like glass fiber reinforced epoxy, or it may be injection molded using a strong high temperature fiber reinforced plastic material.

In various embodiments, the rotor head 19, that is a part of the rotor torque assembly 10, the spring member 14 and the central member 21, that is a part of the rotor blade assembly 11, may all a molded as one combined part. This design reduces the number of parts in the rotor and reduces the assembly time of the whole rotor assembly. The spring member section of this combined member may take up any number of shapes and may just as well be designed so the arms of the plus-sign shaped cross section instead are molded as separate elements or as elements with other shapes.

Apart from the new combined spring member 14, the function and performance of this first alternative embodiment is similar to the embodiments described above.

Second Alternative Embodiment

Figure 8A:
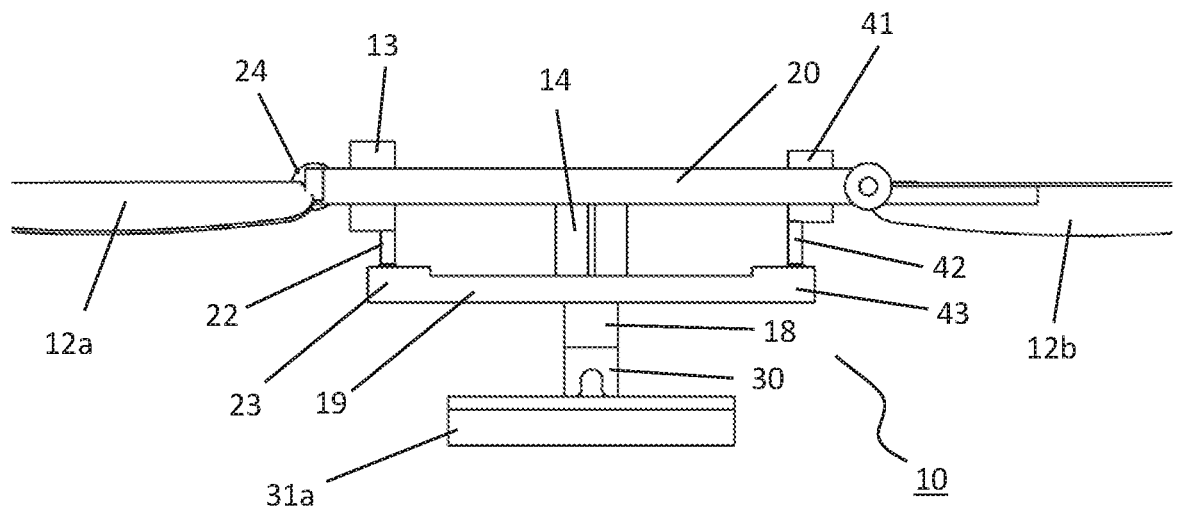
FIGS. 8a and 8b illustrate a second alternative thrust-generating rotor assembly from the front in a plan view and in a plan cut-through view according to one embodiment of the present invention.

A second alternative embodiment of the present invention is discussed with reference to FIGS. 8a and 8b. In this embodiment, the combined spring member 14 described in the first alternative embodiment above, is again used. Furthermore, the torque damper 41 is now placed at the inner end of the second rotor blade 12b, fixed to the connecting member 20 on the opposite side relative to the pitch damper 13. The torque arm 42, connected to the torque damper 41, is extending down, ending in a torque arm connection 43 that connects it to an outer end of the rotor head 19 on the opposite side relative to the pitch arm connection 23.

An important difference relative to embodiments described earlier is that both dampers now have the first inner concentric parts 13a and 41a connected to the rotor blade assembly 11 and the respective arms 22 and 42 are fixed to the second outer concentric parts 13b, 41b. The second concentric parts 13b, 41b now form a full housing completely surrounding the first part. The main advantage of this design is to eliminate the large diameter seal between the first and the second concentric parts described in previous embodiments. To keep the damping fluid that fills the cavity between the two concentric parts in place and to prevent it from leaking out there is a tight fit or a small diameter seal between the parts. As may be seen in FIG. 8b, in this second alternative embodiment, there is now only a small gap between the central hole in the housing and the shafts holding the first inner concentric parts 13a and 41a. Because the diameter of the shaft and the central hole in the second concentric parts 13b, 41b is so small, no additional seal is required.

To further reduce the number of parts, the shafts holding the two dampers are now combined with the two pitch hinge pins 17. The pitch hinge pins 17, connecting the pitch damper 13 and the torque damper 41 to the rotor blade assembly 11, are respectively fixed to the connecting member 20 and to the central member 21. The two pins may be connected in slightly different ways.

Figure 8B:
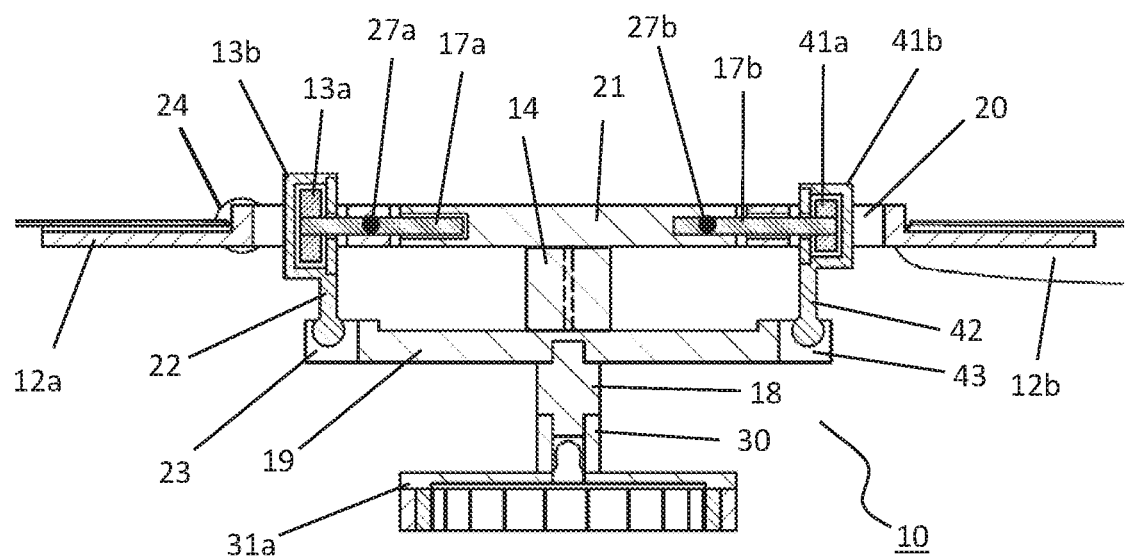

As may be viewed in FIG. 8b, the pitch hinge pin 17a extends from the first concentric part 13a of the pitch damper 13 through a centrally placed hole in the second concentric part 13b, further through the connecting member 20 into a larger diameter hole in the central member 21. An additional fastening means or fastener 27a fixes the pitch hinge pin 17a, and thereby the pitch damper 13, to the connecting member 20 while it is still able to rotate freely in its connection to the central member 21. Because of the fixed connection between the connecting member 20 and the pitch damper 13, the rotor blades 12 will alter their blade pitch angle 16 when subject to tilting moments acting through the pitch damper 13 as previously explained.

On the opposite side of the rotor assembly, the pitch hinge pin 17b extends from the first concentric part 41a of the torque damper 41 through a centrally placed hole in the second concentric part 41b, further through a larger diameter hole in the connecting member 20 and into the center member 21. An additional fastening means or fastener 27b fixes the pitch hinge pin 17b to the central member 21, enabling the connecting member 20 to rotate about the pitch hinge pin 17b independent of the torque damper 41. In other words, through the fixed connection by the pitch hinge pin 17b, in the central member 21, the torque damper 41 will follow all the movements of the rotor blade assembly 11 when the rotational offset 26 varies. At the same time, the connecting member 20 may tilt freely about the pitch hinge pin 17b. Because the torque arm 42 extending down from the torque damper 41 is connected to the rotor torque assembly 10 through the torque arm connection 43, the torque arm 42 will have to tilt, thereby rotating the second concentric part 41b of the torque damper 41 to accommodate variations in the rotational offset 26. Because the torque damper 41 is linked to the rotational offset 26 as described above, it acts as a damper for the resonant operation of the rotor assembly.

Apart from the combined spring member 14 and the new position of the dampers 13 and 41, the function and performance of this second alternative embodiment is similar to the embodiments described above.

Further Alternative Embodiments

The present invention may take on many different forms and shapes, and while studying different embodiments of the pitch damper 13 herein, further alternative embodiments may be realized. Typically, the function of the control system will be maintained as long as one part of the pitch damper 13 is linked to the movement of the rotor torque assembly 10 and a second part of the pitch damper 13 is linked to the tilting of the rotor blade blades 12. Further, damping means or dampers between the two damping member parts is required to be adjusted so the two parts generally follow each other's movements at rapid or cyclic changes in the speed and position of the rotor torque assembly 10, and allow movement of the two parts with respect to each other at slow or permanent changes in speed and position of the rotor torque assembly 10.

The same argument holds for the design of alternative embodiments of the torque damper 41 as long as its properties are tuned to the spring member 14 and the rotational moments of inertia in the rotor assembly with respect to resonance as discussed earlier.

In another alternative embodiment of the present invention the stabilizing flybars 24 may take different form or shapes. The flybars 24 may be positioned further out on the rotor blades 12, may be extending longer or shorter out from the rotor blades 12, may be angled up or down with respect to the rotational plane or they may be molded as an integral part of the rotor blades.

Further, the embodiments herein describe a single rotor aircraft, but one may easily envision an aircraft where more than one, for example two or four, rotors are used. These, more than one rotors, may be set up to provide an equal amount of horizontal and vertical thrust on input from an operator, or they may be configured so one rotor provides a majority of the vertical and/or horizontal thrust and the other(s) provide a minority of the thrust.

Finally, the design for resonant operation described in this document may be used in any other torque dependent rotor control systems where a driving part of the assembly is connected to a driven part, the rotor blades, through a spring member.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

The invention claimed is:

1. A cyclic pitch control system for controlling a blade pitch angle of a thrust generating rotor assembly, the cyclic pitch control system comprising:
   the rotor assembly, wherein the rotor assembly comprises a rotor torque assembly comprising a rotor shaft rotationally connected to a rotor blade assembly comprising rotor blades being able to tilt about a rotor blade axis;
   wherein the rotor blade assembly has a tilting moment of inertia about the rotor blade axis and a first rotational moment of inertia about a rotor shaft axis;
   wherein the rotor torque assembly includes a rotational part of a motor connected to the rotor torque assembly, and has a second rotational moment of inertia about the rotor shaft axis, that is smaller than the first rotational moment of inertia;
   at least one spring member, connected to both the rotor torque assembly and the rotor blade assembly, configured to transfer torque between the rotor torque assembly and the rotor blade assembly and deform in case of an alteration in torque resulting in a rotational offset between a rotational position of the rotor torque assembly and a rotational position of the rotor blade assembly;
   a motor controller configured to transform a control signal into control of a torque generated by the motor throughout each rotation;
   a connecting member configured to transfer changes in the rotational offset between the rotational positions of the rotor torque assembly and the rotor blade assembly into changes in the blade pitch angle;
   wherein a rotational speed of the rotor blade assembly, due to the first rotational moment of inertia being higher than the second rotational moment of inertia, varies less than a rotational speed of the rotor torque assembly; and
   wherein characteristics of the at least one spring member, the tilting moment of inertia and the second rotational moment of inertia, are configured with respect to each other to provide a rotational resonance frequency range of the rotor torque assembly within a range of rotational frequencies of operation for the rotor assembly, thereby providing a resonant gain effecting the rotational offset in relation to changes in torque generated by the motor.

2. The cyclic pitch control system of claim 1,
wherein at least a stiffness of the at least one spring member and/or the moments of inertia associated with the rotor blade assembly and the rotor torque assembly are configured to provide the resonant gain in the rotational offset in relation to changes in torque generated by the motor.

3. The cyclic pitch control system of claim 2, wherein the resonant gain is between 1.1 and 4.

4. The cyclic pitch control system of claim 2, wherein:
a maximum level of the resonant gain is controlled by an amount of damping from a torque damper; and
the torque damper comprises a first concentric part and a second concentric part adapted to fit together, a pitch hinge pin extending from the first concentric part of the torque damper through a centrally placed hole in the second concentric part, further through a larger diameter hole in the connecting member and into a central member of the rotor blade assembly, and a fastener fixing the pitch hinge pin to the central member, enabling the connecting member to tilt about the pitch hinge pin independent of the torque damper.

5. The cyclic pitch control system of claim 1, wherein:
the first rotational moment of inertia is between four and ten times that of the second moment of inertia.

6. The cyclic pitch control system of claim 1, wherein the first rotational moment of inertia is between ten and twenty times that of the second moment of inertia.

7. The cyclic pitch control system of claim 1, wherein:
the rotational offset is controlled by the motor controller during a rotation of the rotor by adjusting a torque, from the motor connected to the rotor torque assembly, at a desired rotational position provided by a rotational sensor configured to measure or determine rotational positions of the rotor torque assembly with respect to a reference position; and
the connecting member is configured to transfer cyclic changes in the rotational offset into cyclic changes in the blade pitch angle.

8. The cyclic pitch control system of claim 1, further comprising:
a pitch damper, interacting with a pitch arm, and configured to transfer changes in the rotational offset into the tilting moment of inertia about the rotor blade axis at first changes in rotor torque and to cancel or limit the tilting moment of inertia at second or permanent changes in rotor torque, wherein the first changes are more rapid than the second changes;
wherein the tilting moment of inertia acts on at least one rotor blade to control the blade pitch angle.

9. The cyclic pitch control system of claim 8, wherein:
the rotor blade assembly comprises a first blade and a oppositely pointing second blade respectively being allowed to alter their blade pitch angle by pitch hinges mounted along the rotor blade axis; and
the pitch arm interacting with the pitch damper is connected to the first blade.

10. The cyclic pitch control system of claim 8, wherein:
the pitch damper comprises a first concentric part and a second concentric part, adapted to fit together, configured such that the two concentric parts generally follow each other's movements at first or cyclic changes in the speed and position of the first concentric part and allow the movements of the concentric parts to differ with respect to each other at second or permanent changes in the speed and position of the first concentric part, wherein the first changes in the speed and position of the first concentric part are more rapid than the second changes in the speed and position of the first concentric part.

11. The cyclic pitch control system of claim 10, wherein:
the pitch damper is mounted on the rotor blade assembly;
the concentric parts are adjusted to rotate in a plane generally perpendicular to the rotor blade axis;
the second concentric part is fixed to the rotor blade assembly and the first concentric part is connected to the upper end of the pitch arm; and
the lower end of the pitch arm is connected to a rotor head by a hinged pitch arm connection.

12. The cyclic pitch control system of claim 1, wherein:
the rotor blades are dynamically stable and/or the rotor blade assembly comprises a stabilizing flybar configured to stabilize the tilting moment of inertia about the rotor blade axis as long as there is a difference in blade pitch angle between the rotor blades in the rotor blade assembly.

13. The cyclic pitch control system of claim 1, wherein:
the at least one spring member comprises at least parts of the rotor shaft and is molded together with a rotor head and a central member of the thrust generating rotor assembly as one combined part.

14. The cyclic pitch control system of claim 1, wherein:
the at least one spring member is formed by polymer material reinforced with fiber composite.

15. A method of operating the cyclic pitch control system of claim 1, the method comprising:
receiving, by the motor controller, the control signal to control an aircraft comprising the cyclic pitch control system;
receiving the rotational position of the rotor torque assembly, with respect to a reference position, from a rotational sensor of the cyclic pitch control system;
determining a time advance and an amplitude of a torque variation based, at least in part, on the control signal and the rotational position of the rotor torque assembly; and
controlling the motor connected to the rotor torque assembly to generate the torque variation according to the determined time advance and amplitude.

16. A method of operating a cyclic pitch control system for controlling a blade pitch angle of a thrust generating rotor assembly for an aircraft, the method comprising:
receiving an input control signal to control the aircraft comprising the cyclic pitch control system, wherein the cyclic pitch control system comprises:
the rotor assembly, wherein the rotor assembly comprises a rotor torque assembly comprising a rotor shaft rotationally connected to a rotor blade assembly comprising rotor blades being able to tilt about a rotor blade axis;
wherein the rotor blade assembly has a tilting moment of inertia about the rotor blade axis and a first rotational moment of inertia about a rotor shaft axis;
wherein the rotor torque assembly includes a rotational part of a motor connected to the rotor torque assembly, and has a second rotational moment of inertia about the rotor shaft axis, that is smaller than the first rotational moment of inertia;

at least one spring member, connected to both the rotor torque assembly and the rotor blade assembly, configured to transfer torque between the rotor torque assembly and the rotor blade assembly and deform in case of an alteration in torque resulting in a rotational offset between a rotational position of the rotor torque assembly and the rotor blade assembly;

a motor controller configured to transform a control signal into control of a torque generated by the motor throughout each rotation;

a connecting member configured to transfer changes in the rotational offset between the rotational position of the rotor torque assembly and the rotor blade assembly into changes in rotor blade pitch;

wherein a rotational speed of the rotor blade assembly, due to its relatively higher first rotational moment of inertia, varies less than a rotational speed of the rotor torque assembly; and wherein characteristics of the at least one spring member, the tilting moment of inertia and the second rotational moment of inertia, are configured with respect to each other to provide a rotational resonance frequency range of the rotor torque assembly within a range of rotational frequencies of operation for the rotor assembly, thereby providing a resonant gain effecting the rotational offset in relation to changes in torque generated by the motor;

determining a time advance and an amplitude of a torque variation based, at least in part, on the control signal; and controlling the motor connected to the rotor torque assembly to generate the torque variation according to the determined time advance and amplitude.

17. The method of claim 16, wherein:
at least a stiffness of the at least one spring member and/or the moments of inertia associated with the rotor blade assembly and the rotor torque assembly are configured to provide the resonant gain in the rotational offset in relation to changes in torque generated by the motor.

18. The method of claim 17, wherein the resonant gain is between 1.1 and 4.

19. The method of claim 16, wherein:
the first rotational moments of inertia is between four and ten times that of the second moments of inertia.

20. The method of claim 19, wherein the first rotational moments of inertia is between ten and twenty times that of the second moments of inertia.

* * * * *